US010108326B2

(12) United States Patent
Steinfl et al.

(10) Patent No.: US 10,108,326 B2
(45) Date of Patent: *Oct. 23, 2018

(54) MODULAR RESPONSIVE SCREEN GRID, AUTHORING AND DISPLAYING SYSTEM

(71) Applicant: Andrea Steinfl, Rome (IT)

(72) Inventors: Andrea Steinfl, Rome (IT); Daniele Iori, Frosinone (IT)

(73) Assignee: Andrea Steinfl, Rome (IT)

(*) Notice: Subject to any disclaimer, the term of this patent is extended or adjusted under 35 U.S.C. 154(b) by 281 days.

This patent is subject to a terminal disclaimer.

(21) Appl. No.: 14/977,363

(22) Filed: Dec. 21, 2015

(65) Prior Publication Data

US 2016/0103601 A1 Apr. 14, 2016

Related U.S. Application Data

(63) Continuation of application No. 14/480,213, filed on Sep. 8, 2014, now Pat. No. 9,251,124.

(60) Provisional application No. 61/875,343, filed on Sep. 9, 2013.

(51) Int. Cl.
| | | |
|---|---|---|
| G06F 17/00 | (2006.01) | |
| G06F 3/0484 | (2013.01) | |
| G06F 3/0482 | (2013.01) | |
| G06F 17/21 | (2006.01) | |
| H04L 12/58 | (2006.01) | |
| G06F 3/0488 | (2013.01) | |
| G06F 17/30 | (2006.01) | |

(52) U.S. Cl.
CPC ........ *G06F 3/04847* (2013.01); *G06F 3/0482* (2013.01); *G06F 3/04842* (2013.01); *G06F 3/04886* (2013.01); *G06F 17/212* (2013.01); *G06F 17/30011* (2013.01); *G06F 17/30861* (2013.01); *H04L 51/046* (2013.01); *H04L 51/10* (2013.01); *H04L 51/24* (2013.01); *H04L 51/32* (2013.01); *G06F 17/3089* (2013.01); *G06F 17/30123* (2013.01); *G06F 2203/04803* (2013.01)

(58) Field of Classification Search
CPC .......... G06F 17/211–17/212; G06F 17/30123; G06F 17/30011; G06F 17/30861; G06F 17/3089; G06F 3/0482; G06F 3/04842; H04L 51/046

See application file for complete search history.

(56) References Cited

U.S. PATENT DOCUMENTS

2013/0339901 A1* 12/2013 Kirkham ........... H04M 1/72586
 715/810
2014/0164992 A1* 6/2014 Hogan ................. G06F 3/0481
 715/800

* cited by examiner

*Primary Examiner* — Quoc A Tran

(74) *Attorney, Agent, or Firm* — Steinfl + Bruno LLP

(57) ABSTRACT

A content containing message may be created by a user or multiple users, and may contain content items such as videos, images and hyperlinks. The messages may be sent and exchanged between users, as well as collected, liked or commented on.

28 Claims, 27 Drawing Sheets

| TITLE ON SEVERAL COLUMNS ☐ Name Surname | | |
|---|---|---|
| Lorem ipsum dolor sit amet consecutur adipiscing elit Lorem ipsum dolor sit amet consecutur adipiscing elit #01 | Lorem ipsum dolor sit amet consecutur adipiscing #02 | Lorem ipsum dolor sit amet consecutur adipiscing elit Lorem ipsum dolor sit amet con #03 |
| Lorem ipsum dolor sit amet #04 | Lorem ipsum dolor sit amet consecutur adipiscing #05 | Lorem ipsum dolor sit amet consecutur adipiscing elit Lorem ipsum dolor sit amet #06 |
| Lorem ipsum dolor sit amet consecutur adipiscing elit Lorem ipsum dolor sit amet #07 | Lorem ipsum dolor sit amet #08 | Lorem ipsum dolor sit amet consecutur adipiscing elit Lorem ipsum dolor sit amet consecutur adipiscing elit #09 |
| Lorem ipsum dolor sit amet consecutur adipiscing #10 | + New comment | |

FIG. 13

MODULAR RESPONSIVE SCREEN GRID, AUTHORING AND DISPLAYING SYSTEM

CROSS REFERENCE TO RELATED APPLICATIONS

The present application is a continuation of U.S. patent application Ser. No. 14/480,213, filed on Sep. 8, 2014, which, in turn, claims priority to U.S. Provisional Application No. 61/875,343, filed on Sep. 9, 2013, the disclosure of each of which is incorporated herein by reference in their entirety.

TECHNICAL FIELD

The present disclosure relates to media content aggregation. More particularly, an example embodiment described in the disclosure relates to a modular responsive screen grid, authoring and displaying system.

BRIEF DESCRIPTION OF DRAWINGS

The accompanying drawings, which are incorporated into, and constitute a part, of this specification illustrate one or more embodiments of the present disclosure and, together with the description of example embodiments, serve to explain the principles and implementations of the disclosure.

FIG. 13 illustrates an exemplary structure of the comments in a message.

SUMMARY

Figure 1A:
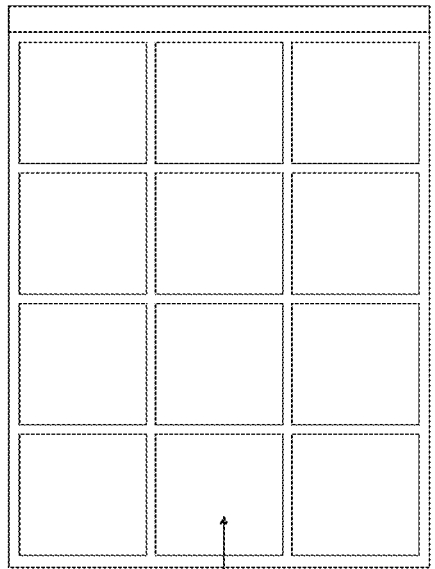
FIGS. 1a-1d illustrate exemplary layouts of a message.
Figure 1B:
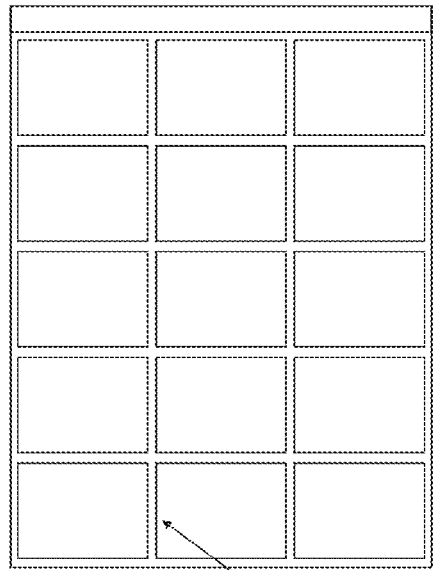

In a first aspect of the disclosure, a method is described, the method comprising: a method, comprising: presenting, to a user of a first computer, a plurality of layout formats, wherein each of plurality the layout formats is user-selectable for dividing a viewing area of the first computer area into a corresponding plurality of cells; creating a single-page document, which based on a user-selection of one of the plurality of layout formats, divides the displayed viewing area into the plurality of cells corresponding thereto; assigning to each cell of the selected plurality, a corresponding item of media content designated from among a plurality of media content items according to a user selection; and rendering the created single-page document over the divided viewing area based on the assigning, wherein the rendered document comprises one or more of: each of the media content items displayed within each of the corresponding cells; or upon activating an interface associated with a selected cell of the document, one or more of an expanded view or an enlarged view of the media content items, or a view thereof which is displaced spatially in relation to the selected cell.

In a second aspect of the disclosure, a device is described, the device comprising: a device, comprising: a bus; a processor coupled with the bus; a display viewing area coupled with the bus; means coupled with the bus and operable to receive input from a user; means coupled with the bus and operable to send and receive single-page messages; and a non-transitory storage medium coupled with the bus and comprising instructions, which are tangibly stored therewith and executable by the processor, wherein, upon executing the stored instructions, the processor is operable for performing or controlling a process, which comprises: presenting, to a user of a first computer, a plurality of layout formats, wherein each of plurality the layout formats is user-selectable for dividing a viewing area of the first computer area into a corresponding plurality of cells; creating a single-page document, which based on a user-selection of one of the plurality of layout formats, divides the displayed viewing area into the plurality of cells corresponding thereto; assigning to each cell of the selected plurality, a corresponding item of media content designated from among a plurality of media content items according to a user selection; and rendering the created single-page document over the divided viewing area based on the assigning, wherein the rendered document comprises one or more of: each of the media content items displayed within each of the corresponding cells; or upon activating an interface associated with a selected cell of the document, one or more of an expanded view or an enlarged view of the media content items, or a view thereof which is displaced spatially in relation to the selected cell.

In a third aspect of the disclosure, a device is described, the device comprising: a processor; a display viewing area; means to receive input from a user; and means to send and receive single-page messages; wherein the display viewing area is divided into cells, based on a layout chosen by the user, thereby constituting a single-page message, wherein the cells are configured to display content items.

An example embodiment of the present invention relates to a method, which comprises presenting to a user of a first computer a plurality of layout formats, wherein each of the plurality of layout formats is user-selectable for dividing a viewing area of the first computer area into a corresponding plurality of cells, which is unique in relation to the other layout formats. A single-page document is created, which based on a user-selection of one of the plurality of layout formats, divides the displayed viewing area into the unique plurality of cells corresponding thereto. A corresponding item of media content is assigned to each cell of the selected unique plurality designated from among a plurality of media content items according to a user selection. The created single-page document is rendered over the divided viewing area based on the assignment. The rendered document comprises one or more of each of the media content items displayed within each of the corresponding cells, and upon activating an interface associated with a selected cell of the document, one or more of an expanded view or an enlarged view of the media content items, or a view thereof, which is displaced spatially in relation to the selected cell.

DETAILED DESCRIPTION

Example embodiments of the present invention are described in relation to a method, which comprises presenting, to a user of a first computer, a plurality of layout formats, wherein each plurality of the layout formats is user-selectable for dividing a viewing area of the first computer area into a corresponding plurality of cells, which is unique in relation to the other layout formats.

A single-page document is created, which based on a user-selection of one of the plurality of layout formats, divides the displayed viewing area into the unique plurality of cells corresponding thereto. As used herein, e.g., in this paragraph, the previous two paragraphs and the next following paragraph (as well as elsewhere within the present specification and claims), the term "unique" refers to the set of spatial, space-filling, appearance-related and/or other characteristics of a given (certain, particular, selected, designated, example, etc.) individual layout format of the plurality of available layout formats, as corresponding to that given layout format, but that set of characteristics of the given layout format does not correspond to other layout formats of the plurality of available layout formats.

A corresponding item of media content is assigned to each cell of the selected unique plurality, designated from among a plurality of media content items according to a user selection.

The created single-page document is rendered over the divided viewing area based on the assigning.

The rendered document comprises one or more of: each of the media content items displayed within each of the corresponding cells, or upon activating an interface associated with a selected cell of the document, one or more of an expanded view or an enlarged view of the media content items, or a view thereof which is displaced spatially in relation to the selected cell.

The present application thus describes systems and methods for online publishing and reading which permit the publication of multimedia contents, with a strong visual impact, in a full page, uniting and mixing different types of media content. The system, or instruments, and methods can be used for publishing and as a service for online social networking. The system and methods allow users to read and write messages comprising, for example, images, text, audio files, videos, live video feeds, and weblinks comprising links to other messages. A single message comprising the above elements represents a minimal unit of information. The message comprises a rectangular grid structure, which can be configured by the user. The content of the message can be interactive, such as allowing the insertion of text, images or videos. The grid structure can be used in a tablet or a smartphone, (such as the devices visible in FIGS. 2a-2c), or other computers such as a desktop or laptop computer (FIG. 3) and any type of display.

The present application describes a visual platform for the messages created by a user. The message comprises content formatted in a single page message, composed on a flexible and customizable grid, for example made of 12 or 15 cells (FIGS. 1a-1d).

Figure 5:
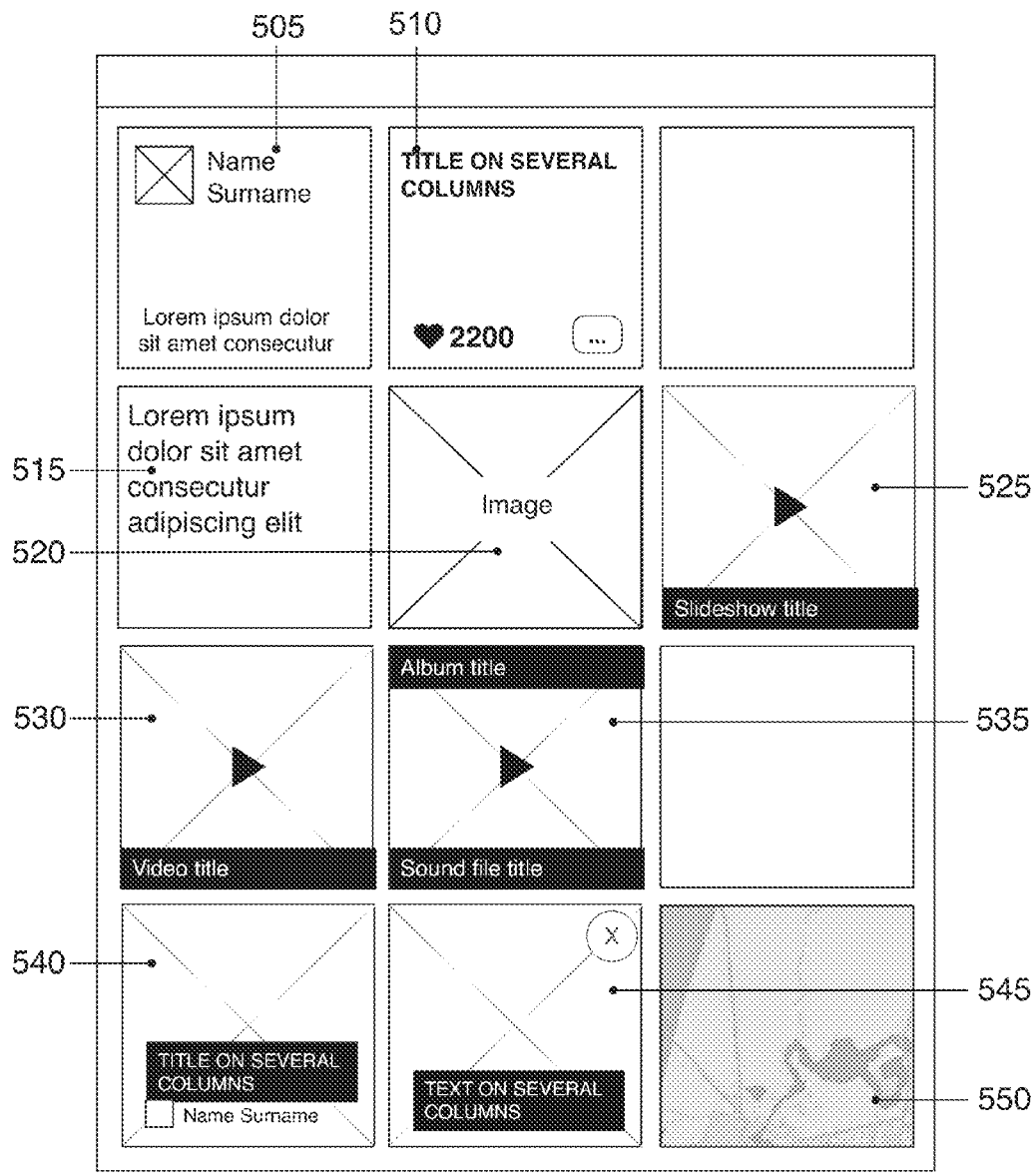
FIG. 5 illustrates exemplary content items in cells.

The users can mix content in a new and playful way. For example, a user can compose a message by mixing different kinds of content (texts, files, images, videos, sounds files, link, etc.) directly on the cells of the grid (FIG. 5). Content may also include API (Application Program Interface) accessible data, PDF files and issue publications.

Figure 6:
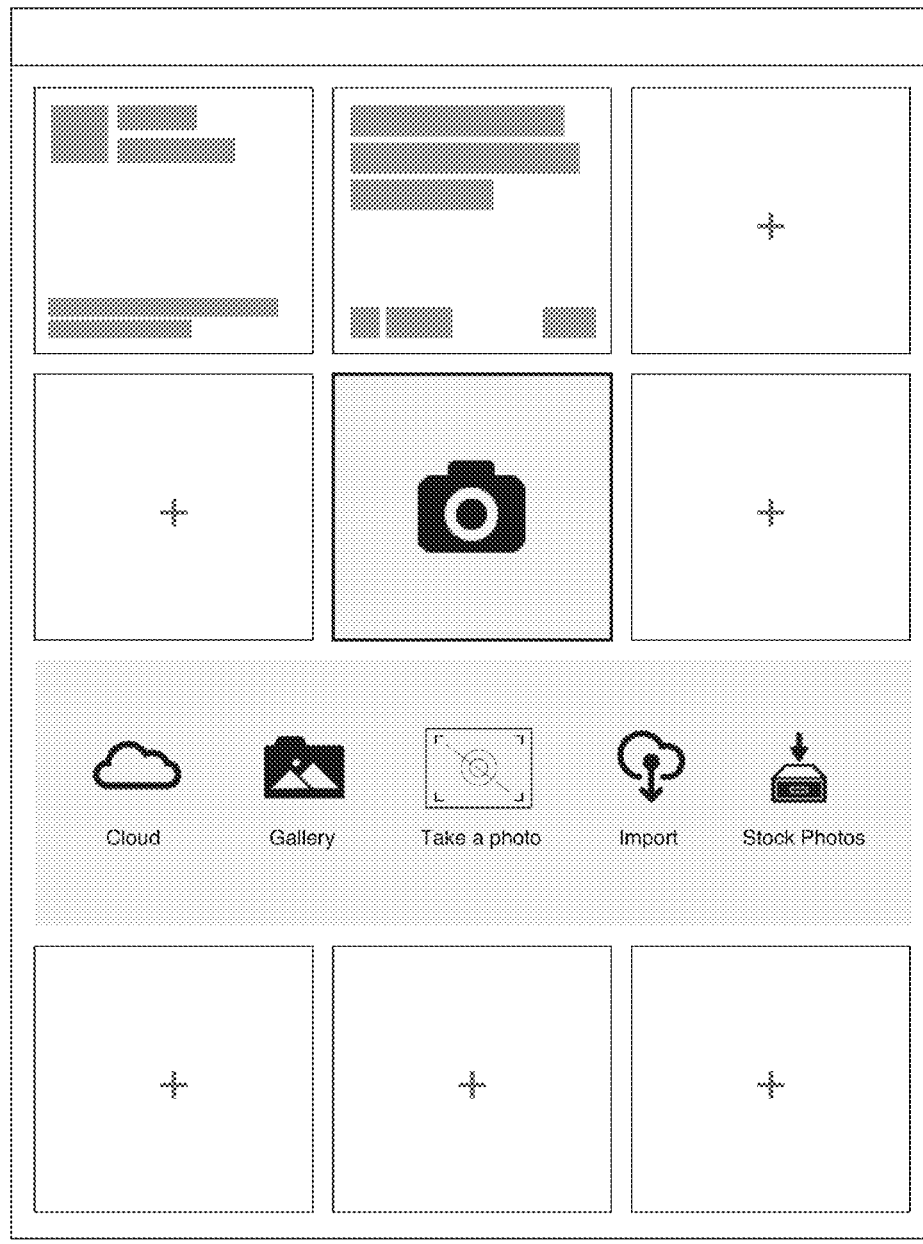
FIG. 6 illustrates an exemplary interface to link or upload a photo in a cell.

Cells can be merged, in order to create larger areas for content. The methods described in the present application apply very well to photography. For example, users can insert their own visual content by accessing images and media files directly from a tablet, smartphone or the web, or by uploading images (see FIG. 6) from their account on other social networks, like Instagram® or Flickr®. The images and media files can be stored in the cloud, a decentralized network of storage servers as understood by the person skilled in the art. Content may reside on the web and may include "mixxied" or other mashed-in data.

Messages can be composed, stored and viewed, for example, on a tablet or smartphone app or website. The users can share a message within an online community of users, or alternatively, the users may use the main social networks like Facebook® and Twitter®, or send it directly to other users.

Users can connect to each other, deciding to follow other users (1740 of FIG. 17), for example receiving regular updates of messages created by other users.

The core content comprises a customizable one page grid divided into modules called cells, for example (101) of FIG. 1a. There can be two main parent-grids 3×4 (FIG. 1a) and 3×5 (FIG. 1b) modules. However, other grid templates may be used.

The two main parent grids can be termed M15 (3×5) and M12 (3×4) and are the two classical grid composition boards. Several other templates are based on these two grids, M15 and M12.

Users can choose from among various grids based on preference or which parent grid better suits their needs. For example, some users may find that the square grid M12 can be used more suitably for displaying content such as square images like those accessed from Instagram®, and/or for text intensive messages. Some users may find that the rectangular grid M15 can be better suited for compositions with classical 4:3 format images.

In mobile devices such as tablets or smartphones, the grid can adapt automatically to the screen of the device (FIGS. 2a-2c), by automatically resizing.

On laptop computers the grid can adapt in height (FIG. 3), showing always the message in its entirety. The type of dividing lines of the grid can be changed or removed at any moment. For example, the dividing lines (110) of FIG. 1b can be removed as in FIGS. 1c-1d. The lines (105) in FIGS.

Figure 1C:
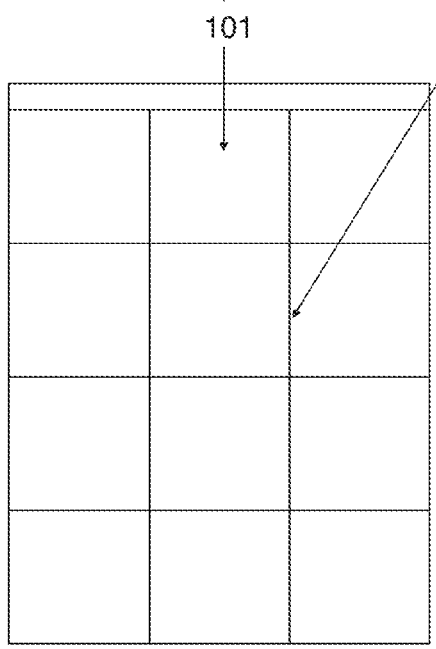
Figure 1D:
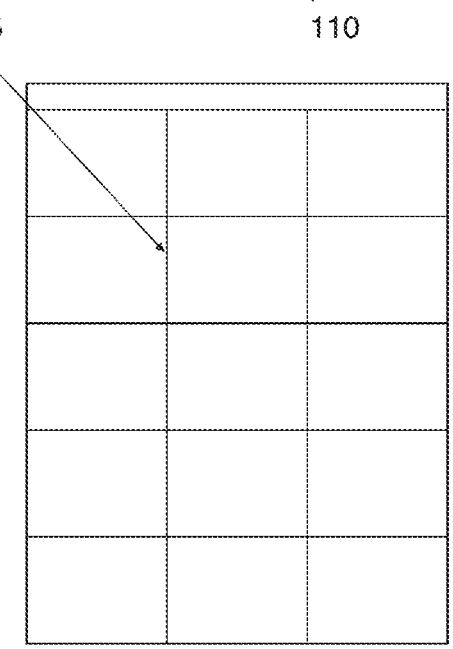

1c-1d are not actual dividing lines in the real message, but are only drawn in FIGS. 1c-1d for representative purposes, to illustrate herein a separation between cells (101) of a message.

Figure 4:
FIG. 4 depicts different exemplary layouts of cells.

Cell behaviour is illustrated in FIG. 4. Users can put contents in one cell, for example (405) in FIG. 4, or can merge more cells together in order to create a larger cell, such as (410), to accommodate contents to achieve the desire visual effect. Cells can be enlarged by merging more cells together (410).

Merged cells can be split back to their original size. Cell content can be moved from one position to another on the grid. Moving a cell's content from one position to another exchanges the content between the starting cell and the ending cell.

Users can drag the content into a different position. The two contents get swapped without changing the cell size. Users can also move a cell from one position to another using positioning arrows.

A cell can be enlarged as long as there are available cells nearby (415). A cell and its content can be deleted. A deleted cell is substituted with a standard empty cell.

In the basic message (a message not yet customized with user content) the first upper left cell can be termed the author cell (420) and the second cell in the first row can be termed the title cell (425)

An example embodiment may be implemented in which an author cell is neither moved nor enlarged (e.g., the author cell cannot be moved, nor enlarged). An example embodiment may be implemented in which the title cell is resizable within the designated title cell position (e.g., the title cell can be resized or enlarged in the same row, but is not or cannot be moved therefrom).

An example embodiment described with reference to FIG. 5 of the present application is based on single page messages with a strong visual impact. The message comprises a single page which fills the display of a device, such as a tablet. An example embodiment may be implemented in which each cell of a message is filled for publication thereof (e.g., a message must have every cell filled before it can be published).

In an example embodiment, messages comprise a minimal content unit (e.g., the message is the minimal unit with which content may be published). The message is characterized by a series of blocks located inside the cells of the grid. These blocks can cover one or more cells and can be dimensioned following appropriate rules.

An example embodiment may be implemented in which any message has at least two special blocks (e.g., the message always has two special blocks which cannot be removed). The at least two special non-removable blocks of the message comprise the author block (505) and the title block (510).

A group of messages can be shown in a list. The elements of the list (e.g., the messages) comprise a preview image, a title and some additional information, such as date of publication, number of likes, number of comments, and the collection to which the message belongs.

The message can comprise the following blocks of content.

TEXT (515): The font or character size of text (515) can be defined in a template. The dimensions can be increased or reduced automatically based on the amount of text written. The user can insert the text directly into the block of the grid.

IMAGE (520): The user can insert an image (520) in the corresponding cell based on a number of options which are available, such as snapping a picture in the moment, choosing a picture from a gallery in the device used (such as a smartphone or tablet), choosing a picture from a gallery in the cloud, or importing the picture from other services, such as social networks and online galleries.

Figure 7:
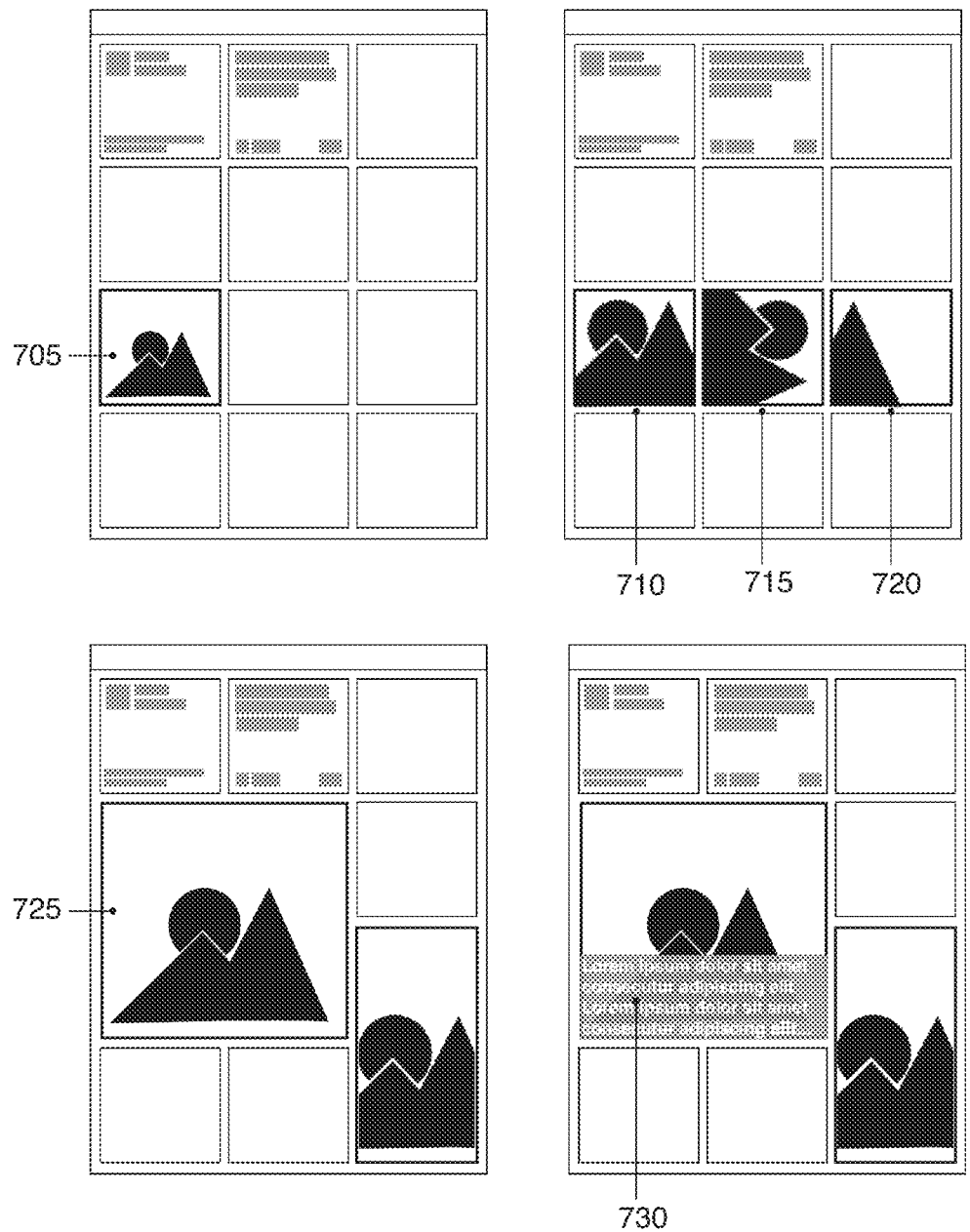
FIG. 7 illustrates examples of automatic editing and resizing of an image in a cell.

The picture can be saved in the memory of the device and in the cloud space of the system. As shown in FIG. 7, the picture can be inserted in the cell, centered and enlarged to fill the whole space available in the cell (705).

The user can move, rotate, resize or crop the image. The resulting image still fills the space of the cell entirely (see, for example (710, 715, 720). The user may also edit other characteristics of the image, such as tone, color, "redeye" or other appearance-related aspects, defects or attributes of the image within the cell.

When several cells are joined (the cell can change dimensions), a new cell is formed and the image is repositioned and recentered with respect to the new center of the new cell (725).

It is possible to insert a text box in the picture, which is shown simply as text over the picture (730).

The picture can be shown in its entirety, in full screen. The user can choose whether the full screen image is shown as the original image before editing, or if instead the edited picture is shown (rotated, resized, etc.).

Photo stocks can be purchased directly through the application in a dedicated marketplace.

SLIDESHOW: Referring again to FIG. 5, the slideshow (525) shows a sequence of images as a type of content in one cell of the grid of a message. Ways to insert a slideshow in the cell are similar to those described above for inserting images.

VIDEO (530): The video (530) is shown in a cell with a thumbnail and a button which can be pressed to start play back. An example embodiment may be implemented in which pressing the play button plays the video in full screen. The video can be inserted through a link given by the service provider which is hosting the video file. Storage of the video can be local (in the device used) and/or in the cloud.

The video can also be inserted in the cell in ways that are similar to those described above for inserting images. An example embodiment may be implemented in which a video file that is linked can also not be saved locally.

SOUND FILE (535): An audio file (535) can also be inserted in a cell as content. The audio file is shown with a thumbnail and a play button which can activate the sound file directly inside the grid. The audio file (535) can be inserted in the cell through the link provided by the service provider which is hosting the audio file. Storage of the audio file (535) can be local or in the cloud. The audio file (535) can be inserted in ways similar to those described above for inserting images. An example embodiment may be implemented in which if an audio file is linked into the cell, the audio file does not need to be saved into local memory.

EXTERNAL LINKS (540): A user can also insert an external link (540) directly into a cell. The cell may also contain text or images at the same time as the link. A link module can permit the creation of a hypertextual link with a different message or with an external web link.

ADVERTISING (545): An advertising (e.g., media content such as an "ad" or "advert" image or the like, which is primarily associated with an advertisement, commercial or otherwise) item (545) can be displayed within the message, with a similar modality as that which displays other content (e.g., as described above).

An advertising module can comprise of any type of content block as described above, such as an image block or a video block. An advertising module can occupy one or more cells and be integrated in the layout of the message. It is possible to remove (or move) the advertisement directly to see the entire message (or at least expand the visible portion thereof), which is unobstructed or unoccluded by the ad). An example embodiment may be implemented in which the removal of the advertisement can be done by paying a subscription or one-off charge, rendering a token, or in which the ad is at least diminished, minimized, reduced, softened, removed, or dissolved, etc. after expiration of a time period set for its display or upon achievement of some other criterion, or remains available for full or other display but is otherwise then obstructed, obscured or occluded by the other non-advertising related media content, either automatically or upon a related user action.

MAPS (550): A user can insert also a map module (550). The map module displays a map from a third party service. The user can choose a place or address and the service identifies the place by showing its location on the map. The map covers always the entire space available to the cell.

The message described in the present application can be public or private. When it is public it is visible to all users. When it is private it can be of two modalities. In a first modality it is visible only to certain users selected by the users (private publishing).

In a second private modality the message is part of a private collection, visible only to a group of people selected by the user (private publishing in collection).

Figure 14:
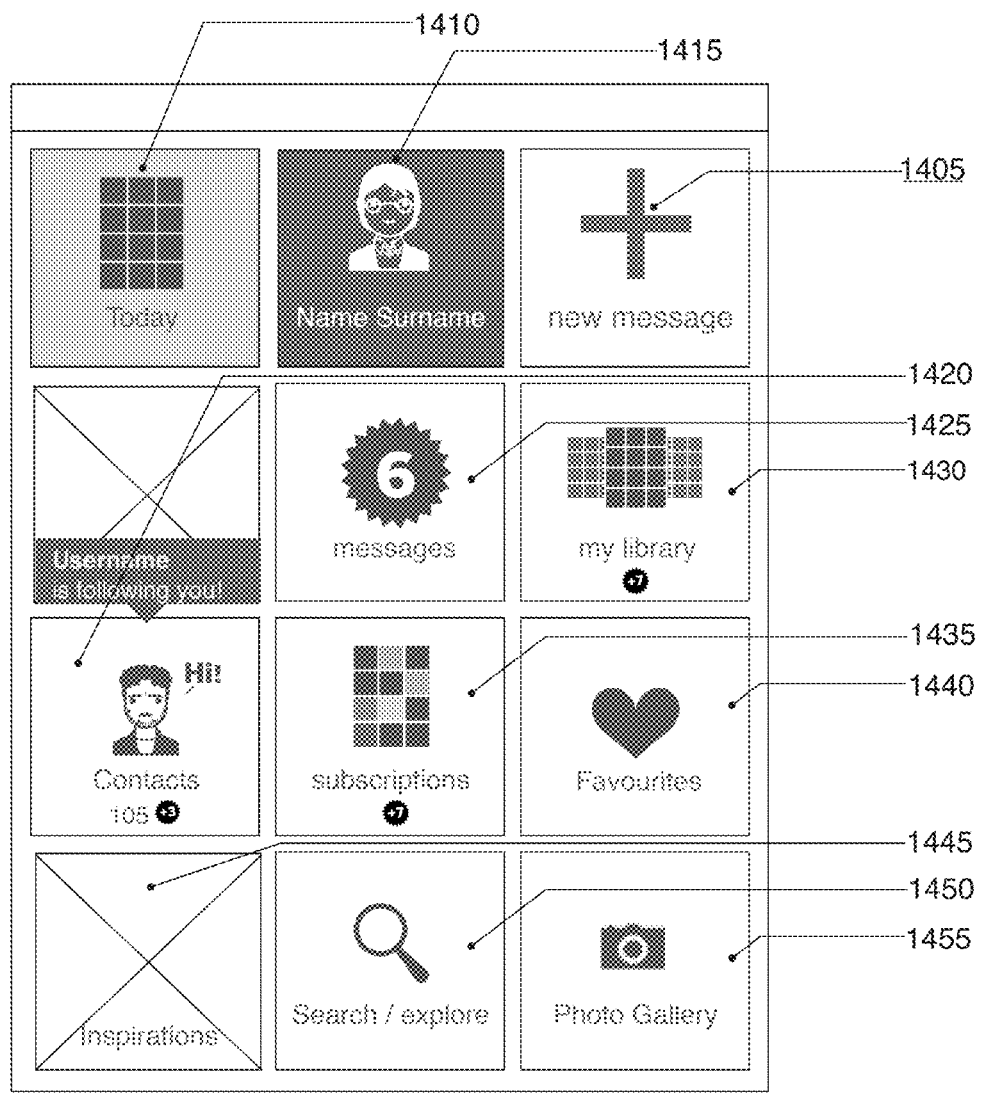
FIG. 14 illustrates exemplary notifications and navigation shortcuts.

To create a new message, the user can choose the option to create a new message, as shown in the example dashboard depicted in FIG. 14 (1405).

Figure 15:
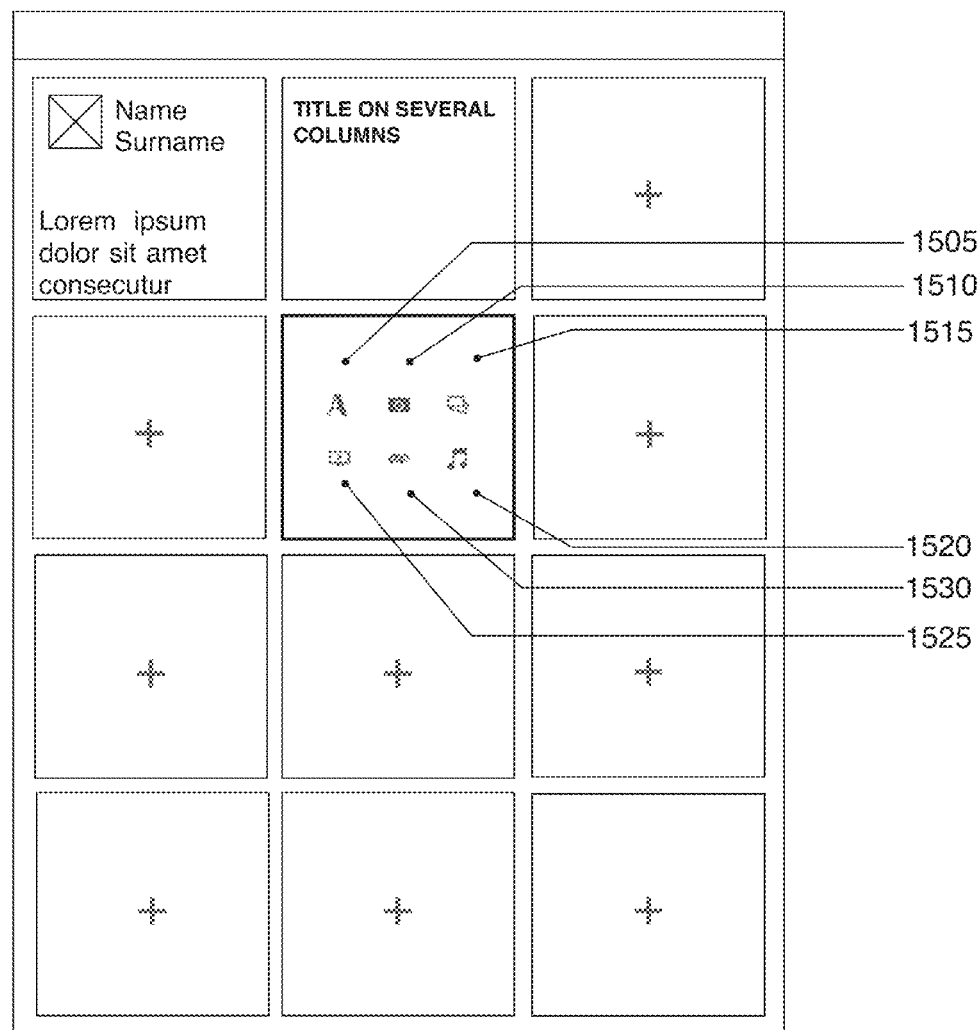
FIG. 15 illustrates a configurable empty grid and the creation of a new message.

Referring to FIG. 15, the system can then show a configurable empty grid. The user can tap on a quadrant and the system displays an icon representative of the possible content to be inserted. The user can swipe the screen to scroll down types of content or can choose a type.

The user can tap on the screen to confirm the content choice. The system can show the procedure to insert the specific content. Possible contents are discussed below.

TEXT (1505): A cursor can be displayed directly in the selected cell. The entire keyboard can be displayed. The text which is entered by the user can be resized automatically based on its length.

IMAGE (1510): Options can be displayed that permit to choose the source of the image. A reference gallery can be chosen and the image can be inserted. The image can be automatically centered with respect to the dimension ratio of the cell. Afterwards it is possible to modify the image based on the necessary edits (such as cropping, rotation, resizing, etc.)

MAPS/AUDIO/VIDEO (1515, 1520, 1525): Options can be chosen to insert an address for a map or a reference link for an audio or video file. The system incorporates automatically the external content.

LINK (1530): To insert a link in a cell a panel of options can be displayed for the link. The system automatically inserts a link and a thumbnail extracted from the content. For text and image cells, the link can be displayed as a secondary information with respect to the image and the text, and can be inserted through an option panel specifically of the cell which hosts the link.

Once the content is inserted the user can edit the content or resize the cell in the grid.

During editing the user can save the message at any time, or the message may be automatically saved by the system.

An example embodiment may be implemented in which, at the end of the editing, the user can publish the message only if all the cells have been edited. An example embodiment may thus be implemented in which all messages are complete (e.g., a "published" message cannot exist if the pre-publication form precursive to the message, such as a message draft, is not complete).

Figure 11:
FIG. 11 illustrates an exemplary editing of a message and the publication of a message.

With respect to their own message, users can take the following actions, as depicted in FIG. 11.

A user can save a message as a draft, even if not completed. A draft message is not published. A user can publish a message subsequently, once the cells have been edited (1110). A user can publish a private message (1115). A user can save (1105) or delete a message (1120).

Figure 12:
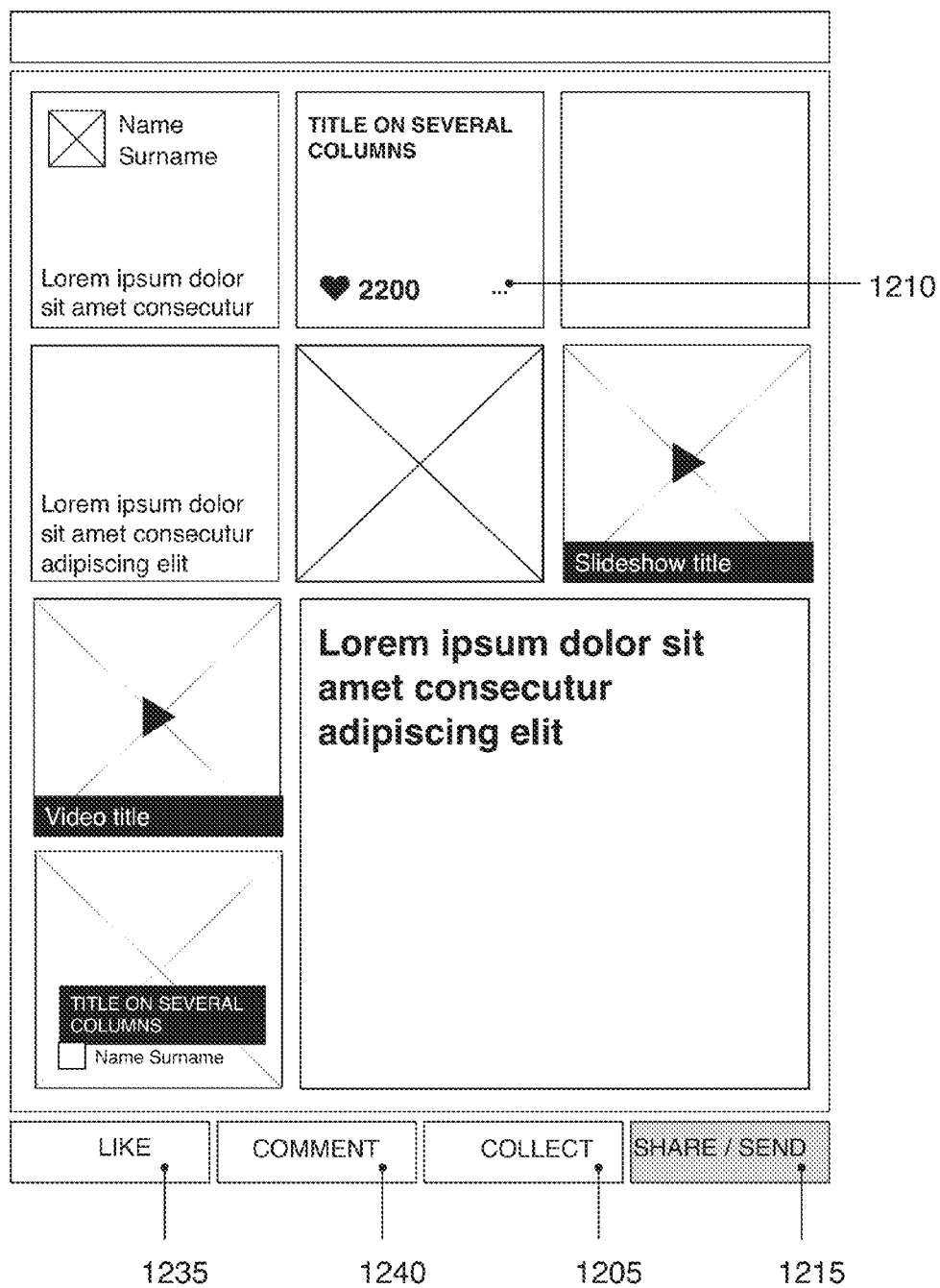
FIG. 12 illustrates exemplary actions that can be taken on a message.

With respect to messages, also of other users, the following actions can be taken, as depicted in FIG. 12.

A user can collect (1205) a message. The link of the message is thus inserted into a collection of links.

A user can flag the message as inappropriate and, if he is the owner of the message, the user can modify the message (1210).

A user can share (1215) the message through common social networks (such as Facebook®, Twitter® and Pinterest®), or through email.

A user can express an appreciation, or like (1235) with a voting function or button. When appreciating something, the message is automatically inserted into the collection of 'favorites'.

A user can comment (1240; see also FIG. 13) on a message through the commenting function.

The user can send (1225) a message as a private message to another user.

A user can take the following actions on the list of their own messages.

A user can choose a preview image.

A user can modify the preview image.

A user can choose which message to put at the top of the list (featured message).

A user can collect the message in a collection.

The grid can fluidly reflow. The informative content of the grid is not altered if the display dimensions are changed, based on what device is used during visualization.

The dimensions of the cells can adapt to the optimal size automatically, as a function of the display size, without any additional actions on the part of the user.

Figure 3:
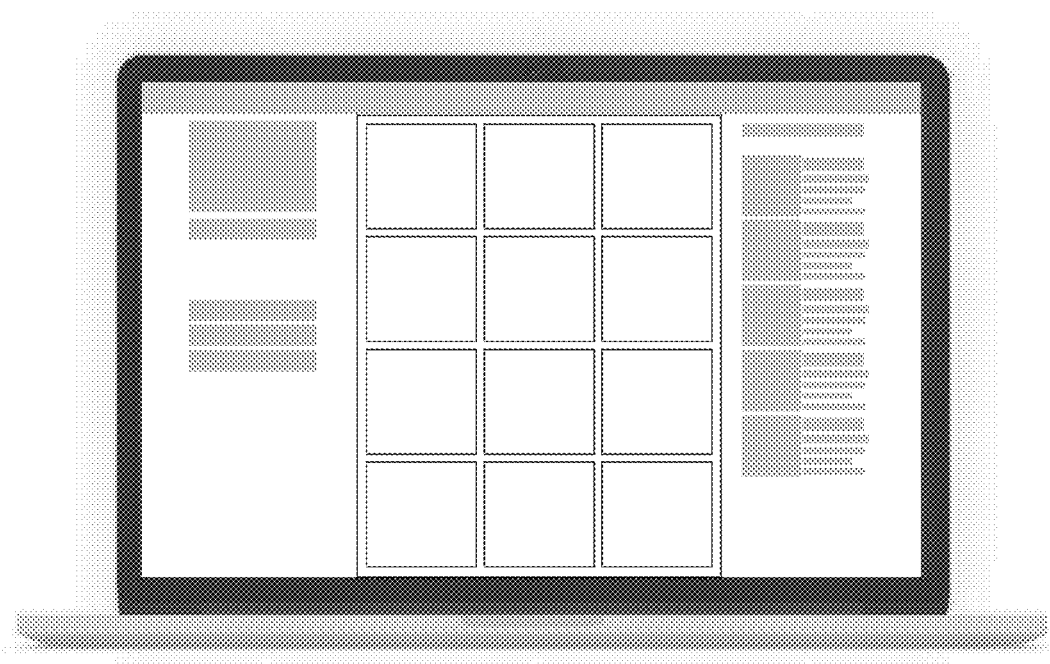
FIG. 3 illustrates an exemplary desktop device.

For screens with a width in excess of 1024 pixels (e.g., desktop visualization) the grid can expand to fill the entire height of the screen available, preserving a ratio of 3:4 (or 3:5) (see, e.g., FIG. 3).

Figure 2C:
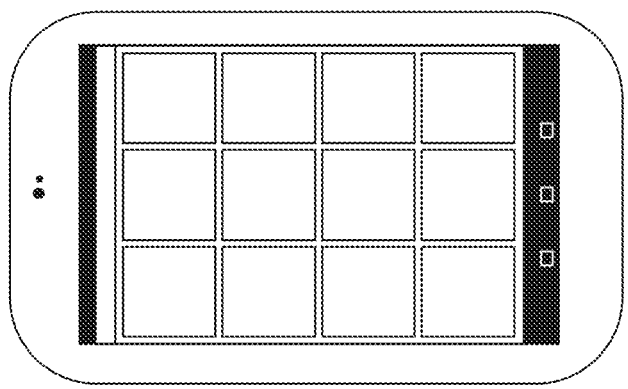
FIGS. 2a-2c illustrate exemplary mobile devices.
Figure 2B:
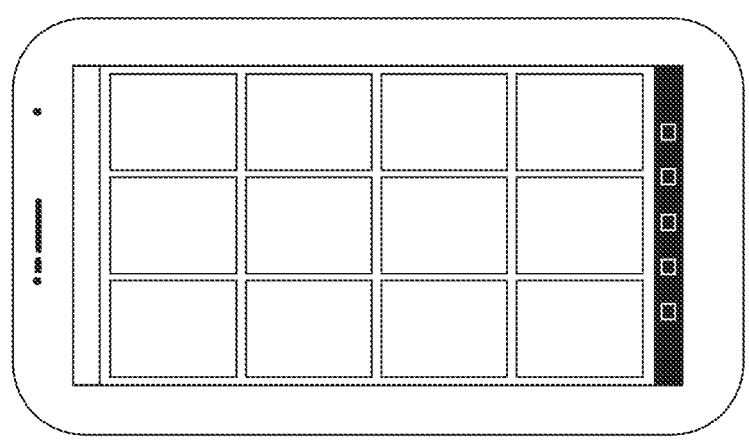
Figure 2A:
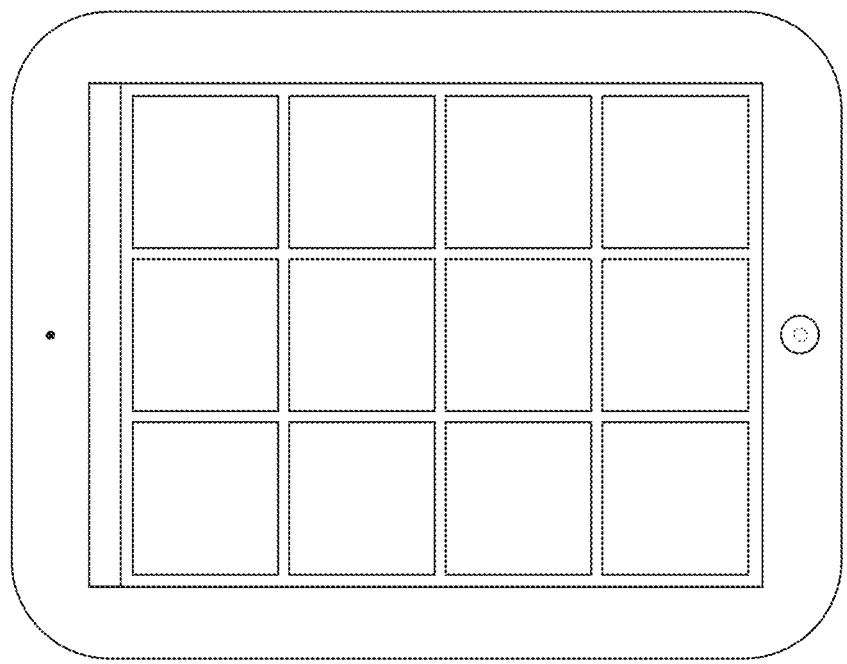

For screens with a width equal or less than 1024 pixels (e.g., smartphone or tablet visualization), the grid can expand to cover the entire screen both in width and height, preserving the correct proportions between the single cells (see, e.g., FIGS. 2a-2c).

The message, as the principal content, comprises an element based on other types of content. For example, the message may be used for microblogging or digital publishing. The other content is forms of aggregations of the base message and provide different possibilities depending on the type of aggregation.

Possible aggregations are as follows.

THE PROJECT (FIG. 9): the project comprises a logic subgroup of the message limited to a multi user profile. The project collects together the content of different users. The project belongs to the ecosystem, but it can be reached from a different link or address.

THE COLLECTION (FIG. 10): the collection comprises a public or private collection of messages. The messages contained in the collection, belonging to the user or to other users, refer to the original message.

Figure 9:
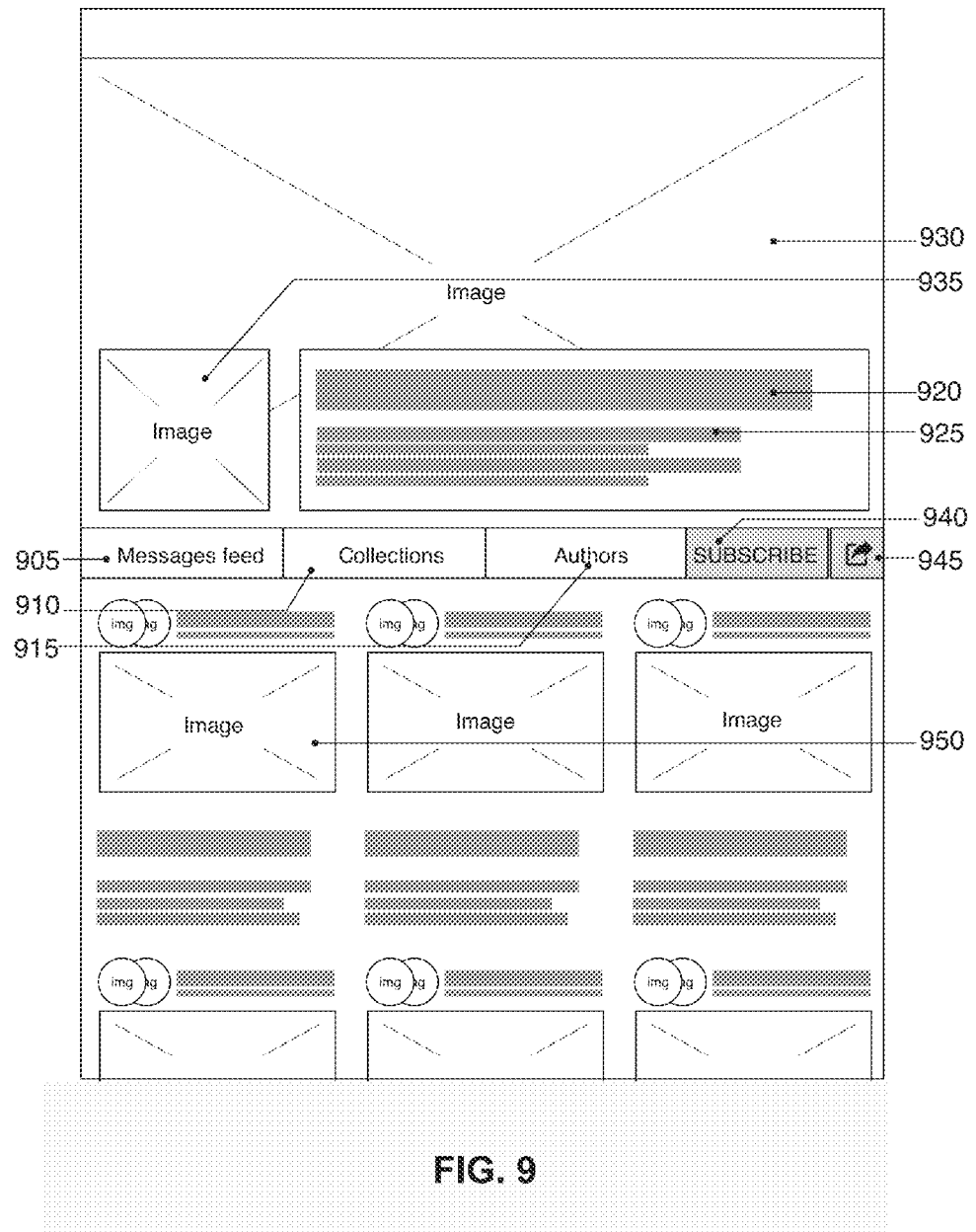
FIG. 9 illustrates an exemplary project structure that contains a list of messages.

As shown in FIG. 9, the project comprises a multi user special profile, which collects one or more messages (950). From the user's point of view, e.g., in view of the fruition of the user's intent, the logic environment of the project may be considered as somewhat delimited and/or separated from the general application of messages. The project is however inserted into the bigger environment of the computer application that implements the messages. The project comprises a subgroup of the computer application, well defined, and the project can be reached from a link which can be personalized by the user.

The objective of the project is to create a work space around a theme or an editorial goal.

With reference to FIG. 9, the structure of the project comprises macro areas, a feed which contains the messages produced (905), collections which contain collections produced (910), authors which display the participants in the project and all the subscribers (915), that is those who receive updates about the project. The project may also comprise a title (920), a description (925), an editable cover (930), an image descriptive of the profile (935) of FIG. 9.

Figure 16:
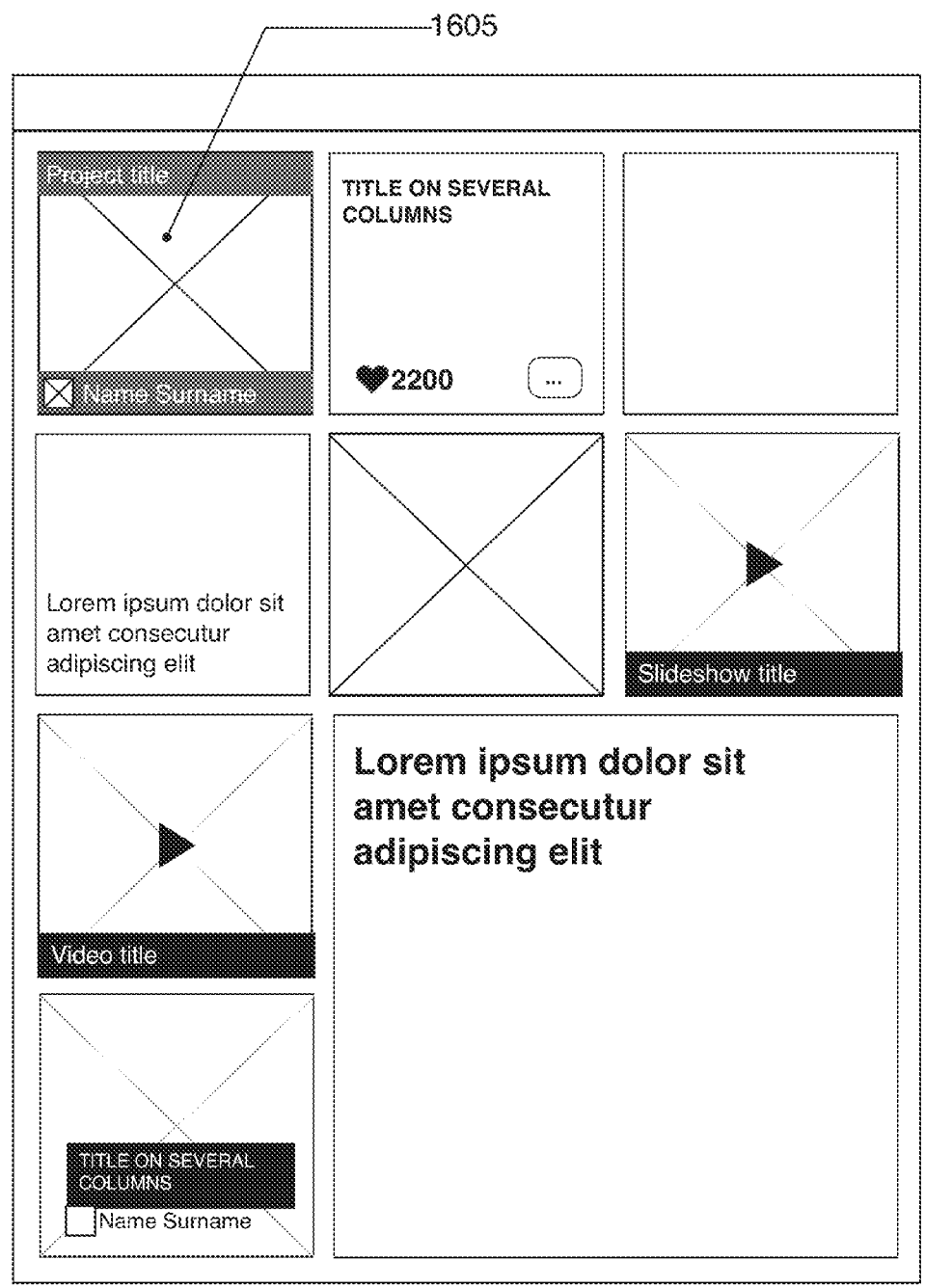
FIG. 16 illustrates an exemplary project message.

With reference to FIG. 16, the messages published in a project have a standard structure as described above. One difference with regard to normal messages is that of the special author cell, which for the project messages displays information on the project (1605).

The messages of the collections can be ordered editorially.

The messages can be featured, that is put on top of the list, in an editorial way, and fixed above the list of other messages.

There is no limit on the messages contained in a project.

A project can be participated in as a reader, or as an author who publishes messages in the project.

Referring again to FIG. 9, participation in the project can happen by publishing directly in the project space (for users who are authorized to publish) or by sending a message (945) to the principal user (the project) which can collect the message and therefore make it visible in the project feed.

A project can be subscribed to by a user (940 of FIG. 9), which entails the reception of notifications every time the project is updated or modified.

A user in a project can take different actions. A user can send a message for publication (945 of FIG. 9). A project can be flagged to allow administrators of the computer application to evaluate the content. A project can be subscribed to (940).

A project can be shared on a social network (945).

A project can be created by the owners of the computer application with a direct intervention, assigning a space of publication to a specific user. Once created, the user becomes administrator of the space and can decide to include other users for publication.

Figure 10:
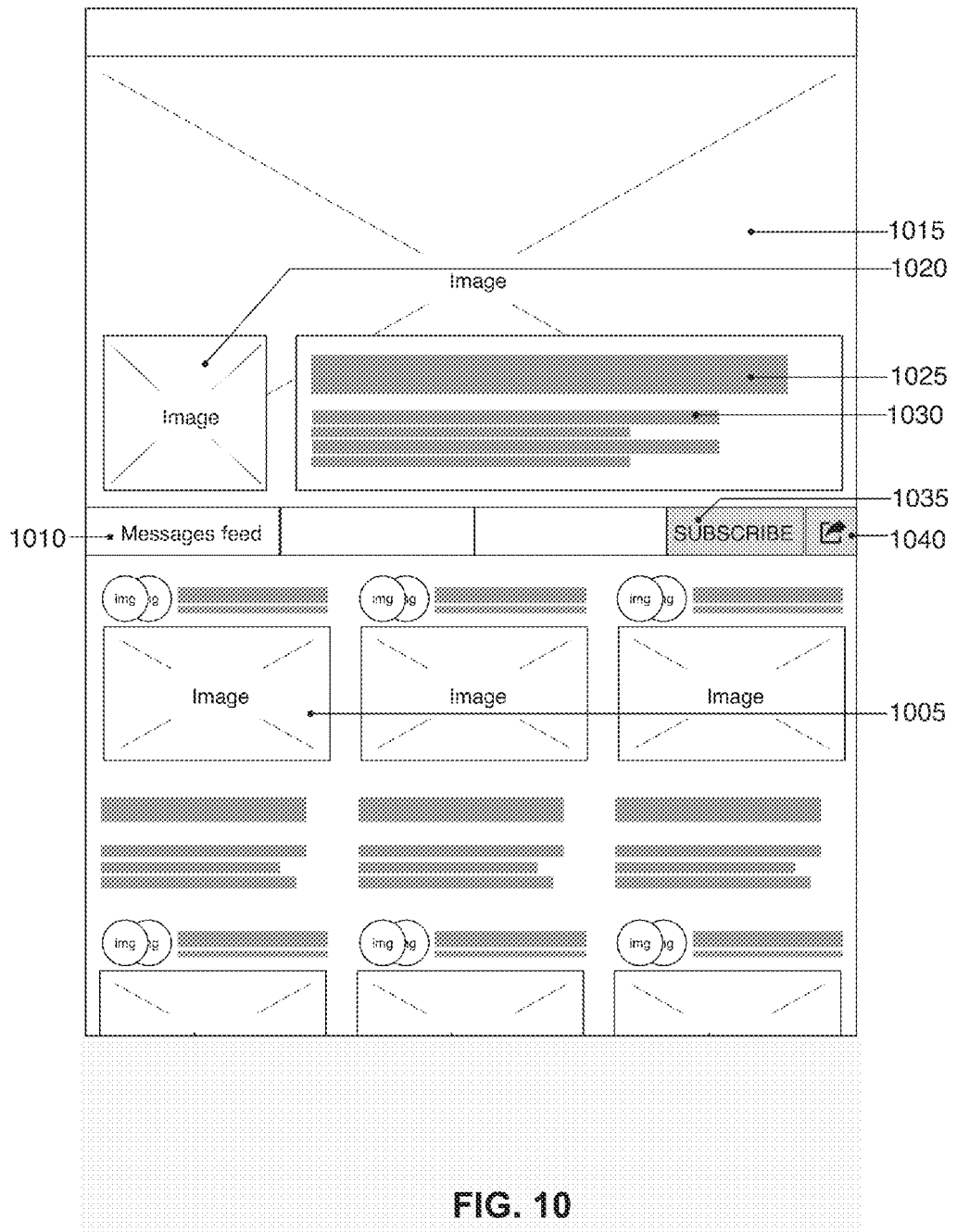
FIG. 10 illustrates an exemplary collection of messages.

With reference to FIG. 10, the collection comprises a group of messages produced by a user (1005 of FIG. 10). The collection can be public or private. The collection can belong to a single user or to multiple users. The collection groups the messages of the author/user, or of other users.

An objective of the collection is to create a system of classification available to the user and a space for collaboration between users. Thus, the collection may function as a classification instrument over the message group.

The structure of a collection (FIG. 10) may comprise a feed that contains collected messages (1010), an editable cover (1015), an image descriptive of the profile of the collection (1020), a title (1025), a description (1030 of FIG. 10).

There is no limit on the collections that can be published. There is no limit on the number of messages that can be collected by a collection.

The collection can be public, therefore visible to everybody, or private. Private collections are therefore visible only to the user who created it, and a designated group of other users.

A collection can be subscribed to by a user (1035 of FIG. 10), which entails the reception of notifications every time the collection is updated or modified.

The messages within a collection can be featured, that is they can be put at the top of the list over other messages, and kept at the top of the list.

The messages can be inserted in a collection at any point of the computer application.

The owner of the collection can remove messages from the collection.

The messages present in a collection can be references. Removing a message from a collection does not cause the deletion of a message from the computer application.

If the original content is deleted, the reference is also deleted from the collection.

Several actions can be taken with regard to a collection: a user can subscribe to a collection (1035 in FIG. 10). A collection can be flagged to allow administrators to verify the content of the collection.

A collection can be shared (1040 of FIG. 10).

A collection can be created by a user who creates an empty collection and then chooses messages to include in the collection, or a user can collect a message and the system can ask the user whether the user wants to insert the message in a collection, either existing or new.

The favorite collection comprises a special private collection which collects all the messages which have been liked by a user.

A message, when created, can be a draft message, which is only visible by the author and not published. As shown in FIG. 11, the message can also be published privately (1115 of FIG. 11), visible only by the author and a designated user. The message can be published privately (1115) and inserted into a private collection, visible only to a group of users designated in the private collection.

A message can be public and visible to all users.

The content inserted in a collection can each maintain their own level of visibility (public or private).

An example embodiment may be implemented in which, if a private collection becomes public, the messages go automatically to a published state. An example embodiment may be implemented in which, once it is made public, a public collection cannot return to be private or otherwise take a non-public status.

The computer application defines a series of relationships between users. This system of relationships and related functions constitutes a social network theme.

The principal element of the social network is the presence of a personal profile (FIG. 17) which has a function to manifest the presence of the user through a series of functions.

The social element of the application is manifested by two other elements, the project and the collection. The project permits the condivision of a space and the creation of a group of messages with a theme.

The collection permits individual activity of classification and selection, but using content from the community of the application, rendering the organization of the content a social activity.

Figure 17:
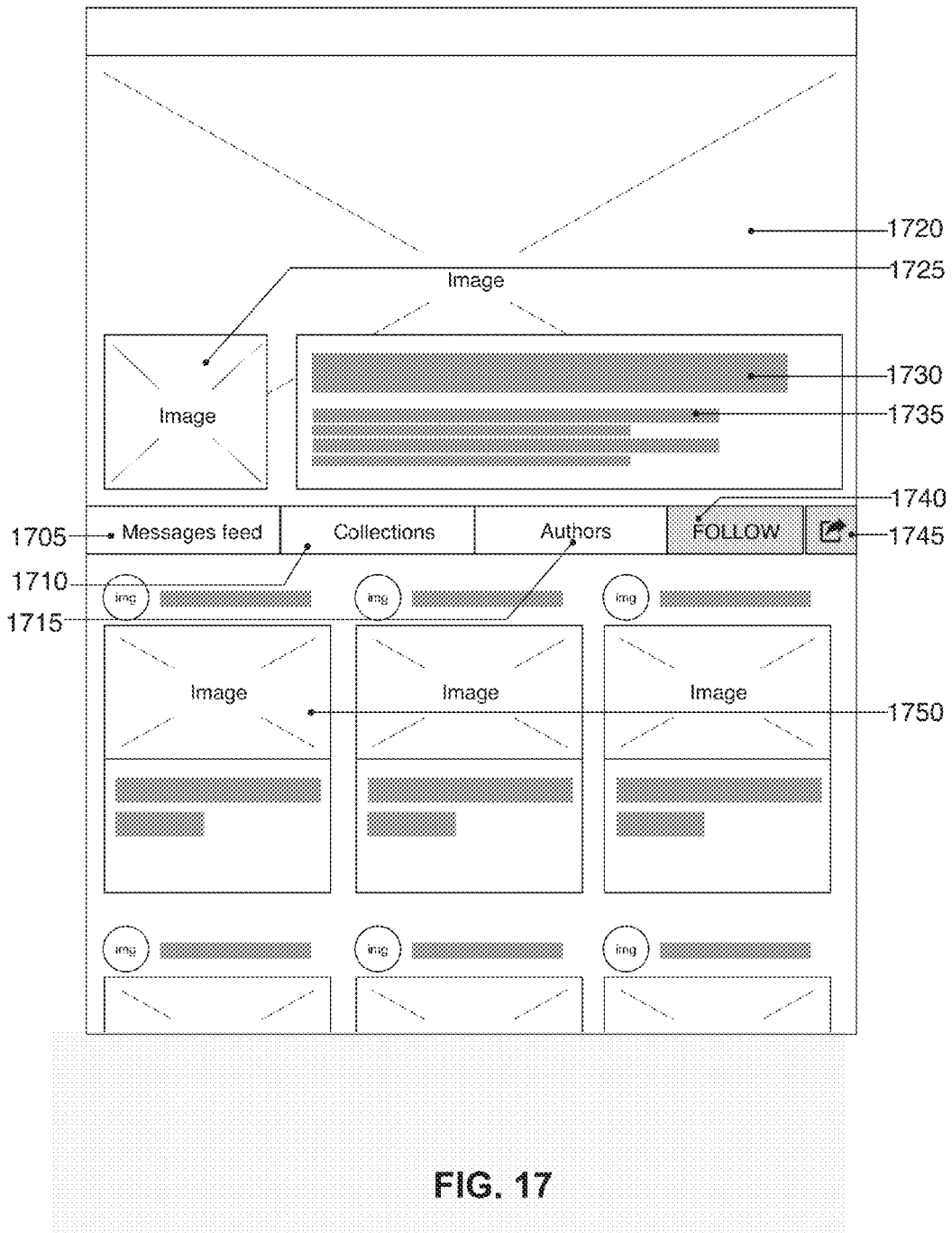
FIG. 17 illustrates an exemplary user profile.

With reference to FIG. 17, the profile comprises the calling card (e.g., a mark, signature, emblem, etc.) of the user within the application and the principal hub for all its content.

Through the profile the user is in contact with other users.

The profile comprises a feed (1705) which contains all the messages produced or collected (1750), collections which contain all the collections created (1710), authors which displays a social network of authors connected to the user (1715), an editable cover (1720), an image descriptive of the profile (1725), a text for identification (name/surname) (1730), a description (1735 of FIG. 17).

The following actions can be taken with respect to the profile. The user can send a personal message (1745 of FIG. 17; see also 1215 of FIG. 12). The profile can be flagged by a user.

The user can follow another user (1740 of FIG. 17). This action inserts the user into the circle of contacts and enables the user to receive notifications on published content.

The profile of a user can be shared (1745 of FIG. 17). The user can be inserted in a collaborative collection. The user can also be permitted to publish a project.

A personal profile is always visible as a fundamental element of recognition and belonging to the system.

FIG. 14 depicts an example dashboard, according to an embodiment of the present invention. The dashboard (FIG. 14) contains notification functions and navigation functions. The notifications (1420, 1425, 1430, 1435) as illustrated in FIG. 14, are a group of signals that permit a user to remain up to date with respect to the actions taken by other users and, in particular, with users in the user circle of contacts. Navigation functions are shortcuts to the most important areas of application: General feed (1410), Personal profile (1415), Favourite collection (1440), the most important collection (1445), search function (1450), photo gallery (1455).

There are two types of notifications: 1) signals, which signal the fact that something has happened, and 2) suggestions, which suggest content that is considered, in some way, interesting to the circle of contacts of the user.

Signals can notify events relative to a message that has been commented on. For example, a signal may annunciate the addition of a new comment. Some such notifications may be changed or disabled, according to a selected user preference (e.g., it is possible to disable, mute or reduce the volume, tone or other characteristic of the notification signal). With respect to the published content, a signal may notify of a new message, a new like received, a new sharing, a new collection event, where the message has been added to a collection.

With respect to a project, the signals may notify of a new subscription to the project, new content sent, new content published, new sharing received, new collections received.

With respect to a collection, the signals may notify of a new subscription, a new sharing, a new collection event.

Suggestions may be related to a contact of the user, for example suggesting a new content inserted, a new like received. With respect to the project, suggestions may notify of new content published. With respect to a subscribed collection, the suggestions may notify of a new content collected. With respect to the general community, suggestions may notify of a new contact received.

In an options panel, it may be possible to receive what kind of notifications to receive.

Comments (e.g., as shown in FIG. 13) may be associated with every (or any) message and may comprise a feedback element for the author of the message. The comments may be displayed (or displayable) in a layer below the message and may always be readable (or at least accessible), even over several pages, by bringing the underlying layer to the front.

Actions that can be taken with respect to the comments comprise inserting a new comment, deleting a comment or flagging a comment as inappropriate.

In the general architecture of the application, the system comprises at least two areas, a general feed and a personal feed.

The general feed permits the exploration of the public content inserted in this application by users.

The personal feed permits the display of updates, which allow a first user to remain up to date with the activities of at least a second user, who is being followed by the first user. As used herein, the term "followed" may relate to, or take the sense in which artisans of ordinary skill in related technical fields (and indeed others) may understand it, of monitoring or staying abreast of and/or current with, the second user's related ongoing activities.

Figure 19:
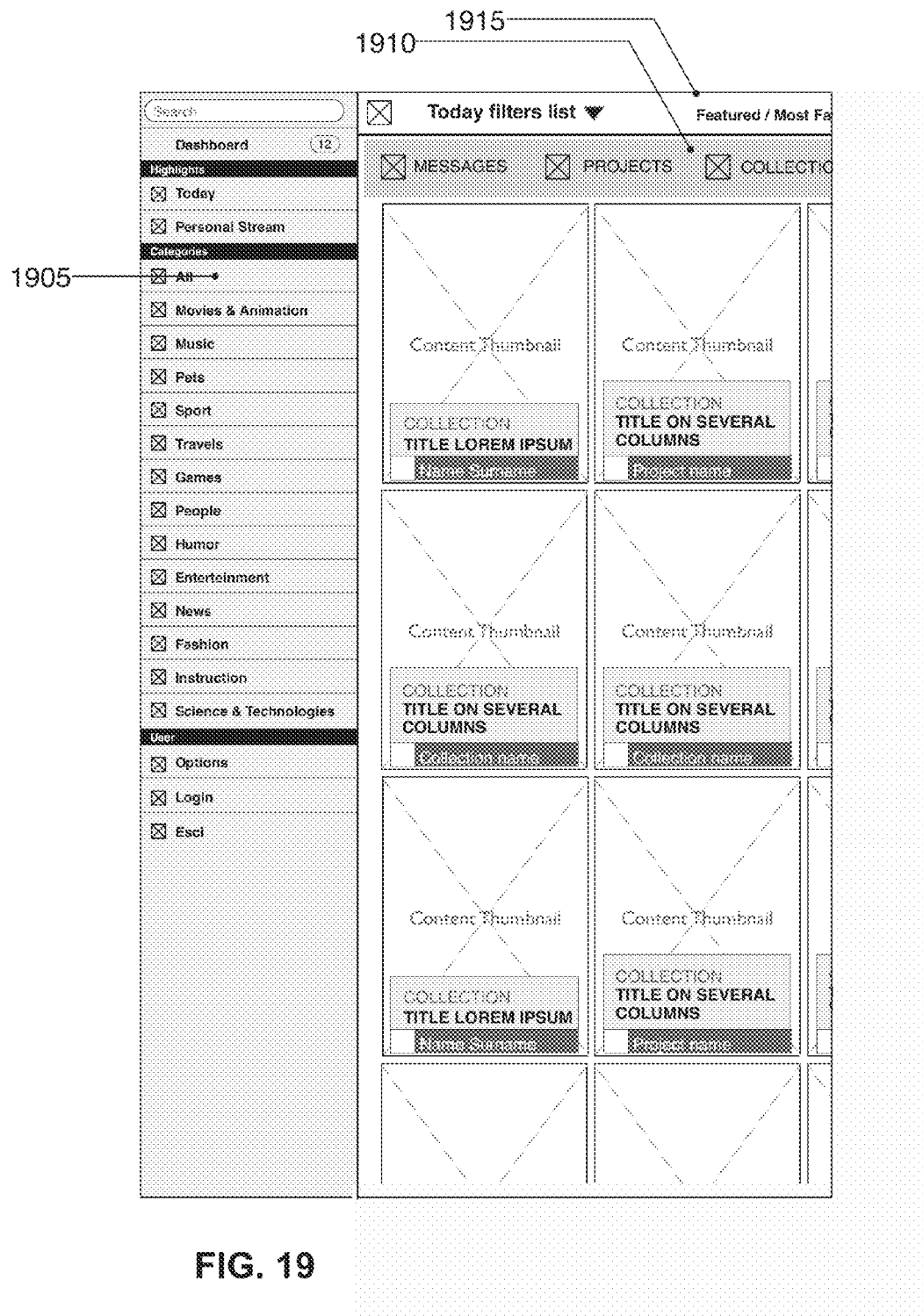
FIG. 19 illustrates an exemplary classification of messages in a general feed.

As shown in FIG. 19, the general feed can be filtered by category (1905 in FIG. 19) or by type of content (1910).

When the user selects or chooses a category or a type of content, the system filters the content available and shows content relative to the selected or chosen category or type.

The two filters, category and type, can also be used additively together over the general feed.

Figure 18:
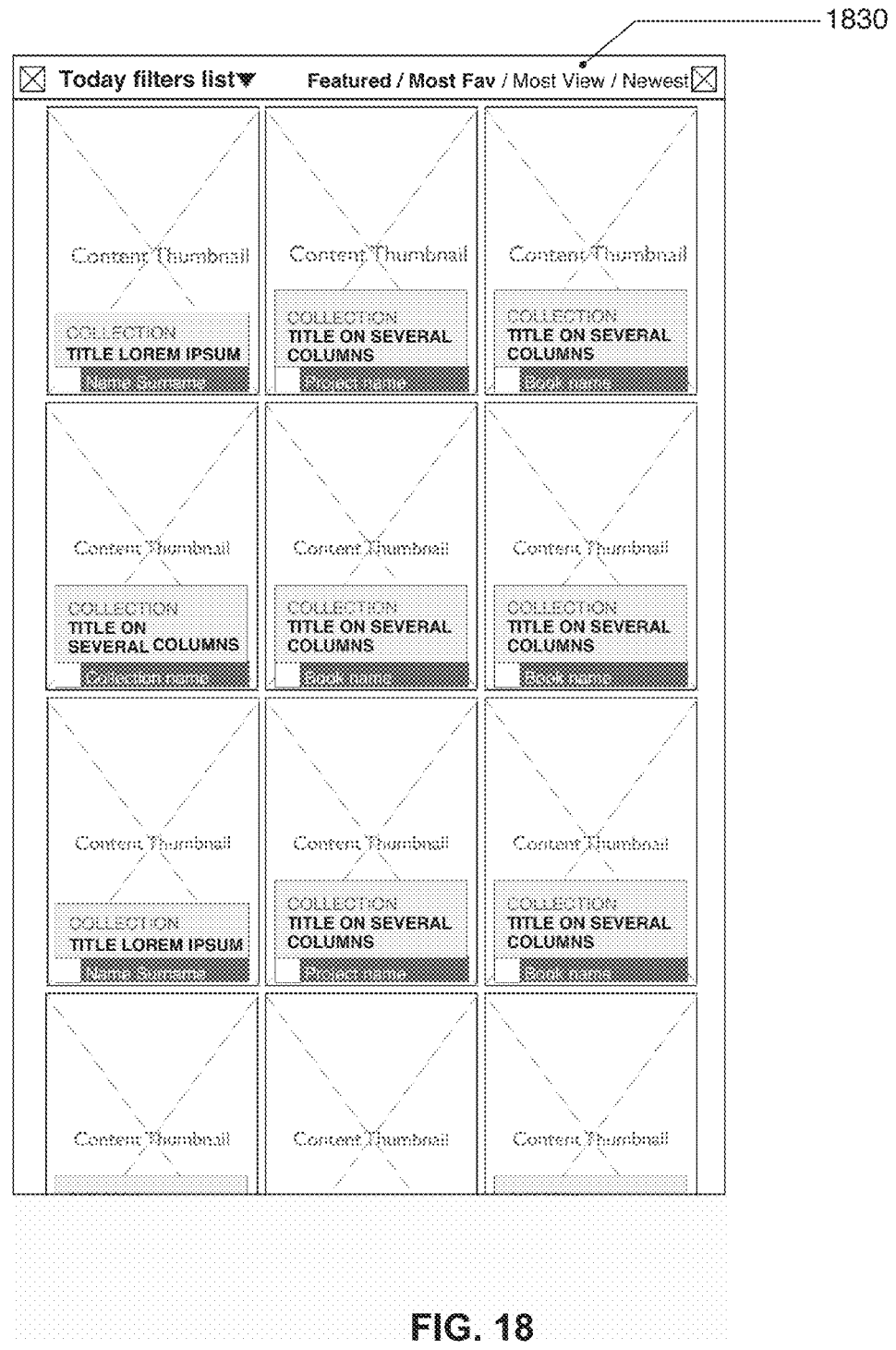
FIG. 18 illustrates an exemplary general feed.

The general feed can be ordered (1830 in FIG. 18, 1915 in FIG. 19) by, based on, or according to newest content, most used or "favorite" content with or without a time frame, most viewed content within a specified or selected time frame (such as a day, last week, last month, all), featured content, and/or content with editorial highlights by a team of administrators of the system.

When the user chooses a type of ordering, the system displays the content ordered following the type of ordering chosen by the user.

The filters and ordering types described above can be used additively.

It is possible to apply an ordering type to the results obtained by applying the filters of type and category.

The personal feed permits the exploration of content produced by users that a user is following, receiving updates for every new content created.

The application is structured so that it can be visible to mobile devices and desktop computers, through the web. Additionally, the application can provide an Application Programming Interface (API) which allows the utilization of core functions to exploit the functionality in applications or web applications of third parties.

The application can implemented in a specific language of the reference device. The application can be used in a tablet, for example with operating systems iOS and Android. The dimensions of the specific tablet do not influence the functionalities of the application. The application automatically adapts to the display screen in a fluid way, as visible in FIG. 2.

An application can also be implemented for smartphones. The smartphones may be implemented to have a typical form-factor somewhat smaller than that characterizing most tablets and thus, the version for a smartphone can be reduced with respect to that of the tablet, and/or somewhat more focused on the visualization and interaction with the community.

The web application can be implemented with similar functionality of the tablet application. The layout and structure can be adapted to the characteristics of the computer screen, keeping in consideration the height of the frame of visualization. The fundamental characteristics of visualization can be held intact for the most common dimensions.

The focus of the application can be divided in three groups, which each relate primarily to content (feeds and project), network, and profile. These three logic visualizations are significant (perhaps even fundamental in some uses) for the three activities, which comprise the fruition of content, the presence within the network of contacts, and the administration of the system. These three principal activities all relate to the creation and editing of content.

The three elements representative of these functions comprise the feed of content (general feed, personal feed, local feeds of collections, projects and profiles), the personal profile, and the network of users.

Figure 24:
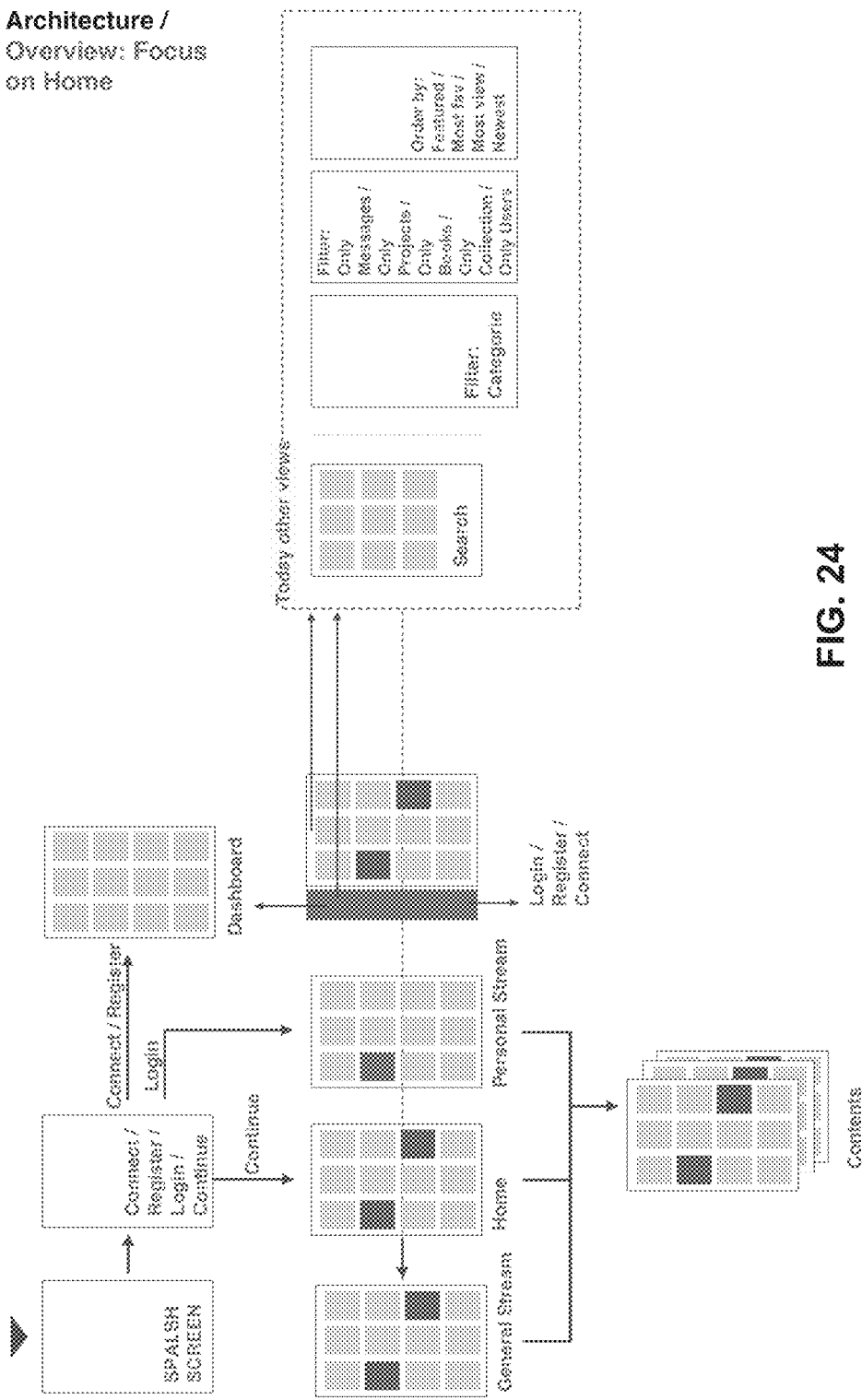
FIG. 24 illustrates an exemplary synthetic visualization of the system focusing on the general feed and its paths.

FIG. 24 illustrates an exemplary synthetic visualization of the system focusing on the general feed and its paths.

Figure 25:
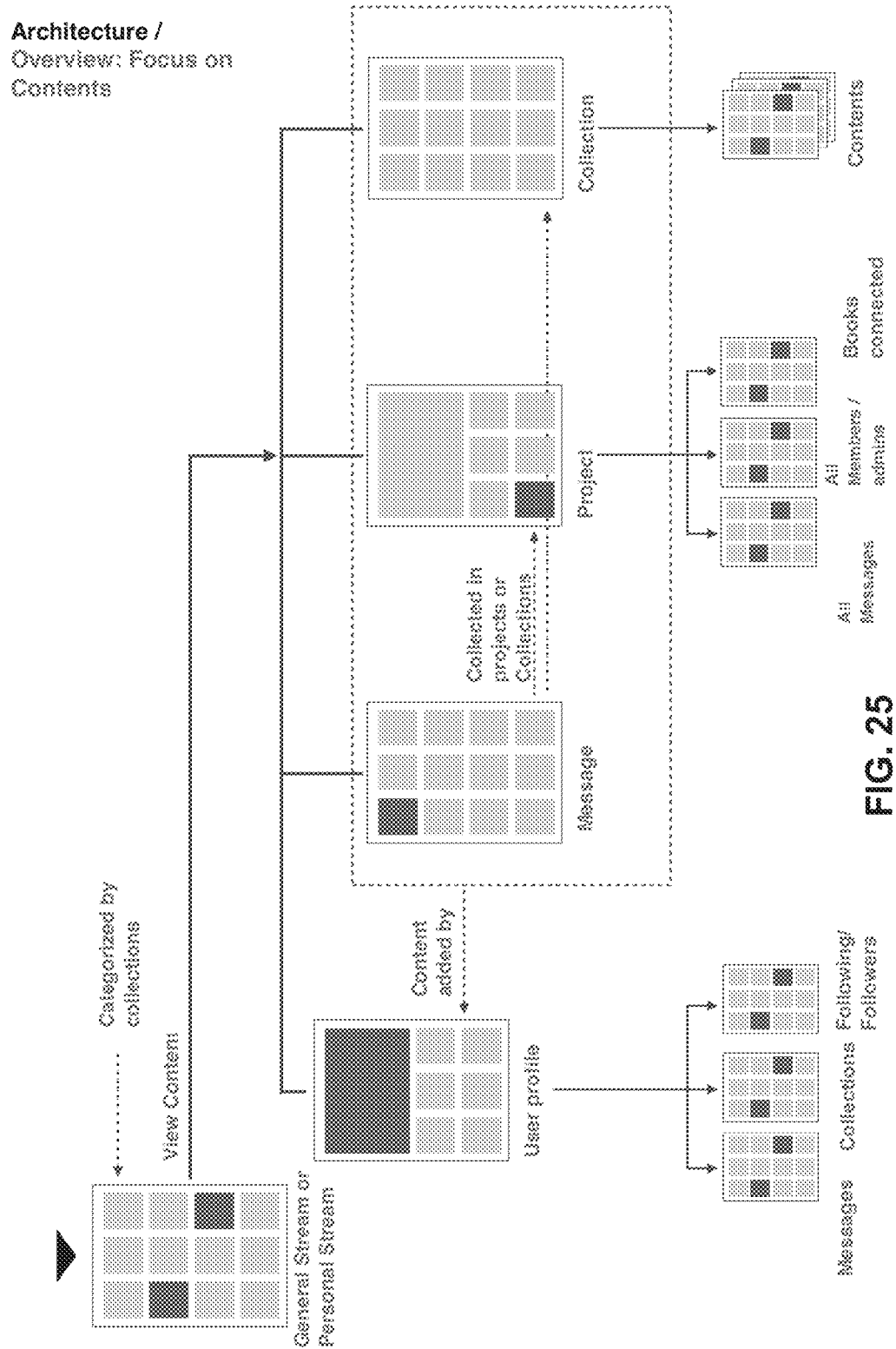
FIG. 25 illustrates a visualization of an exemplary personal profile and its paths, its functionalities and possibilities.

FIG. 25 illustrates a visualization of an exemplary personal profile and its paths, its functionalities and possibilities.

Figure 26:
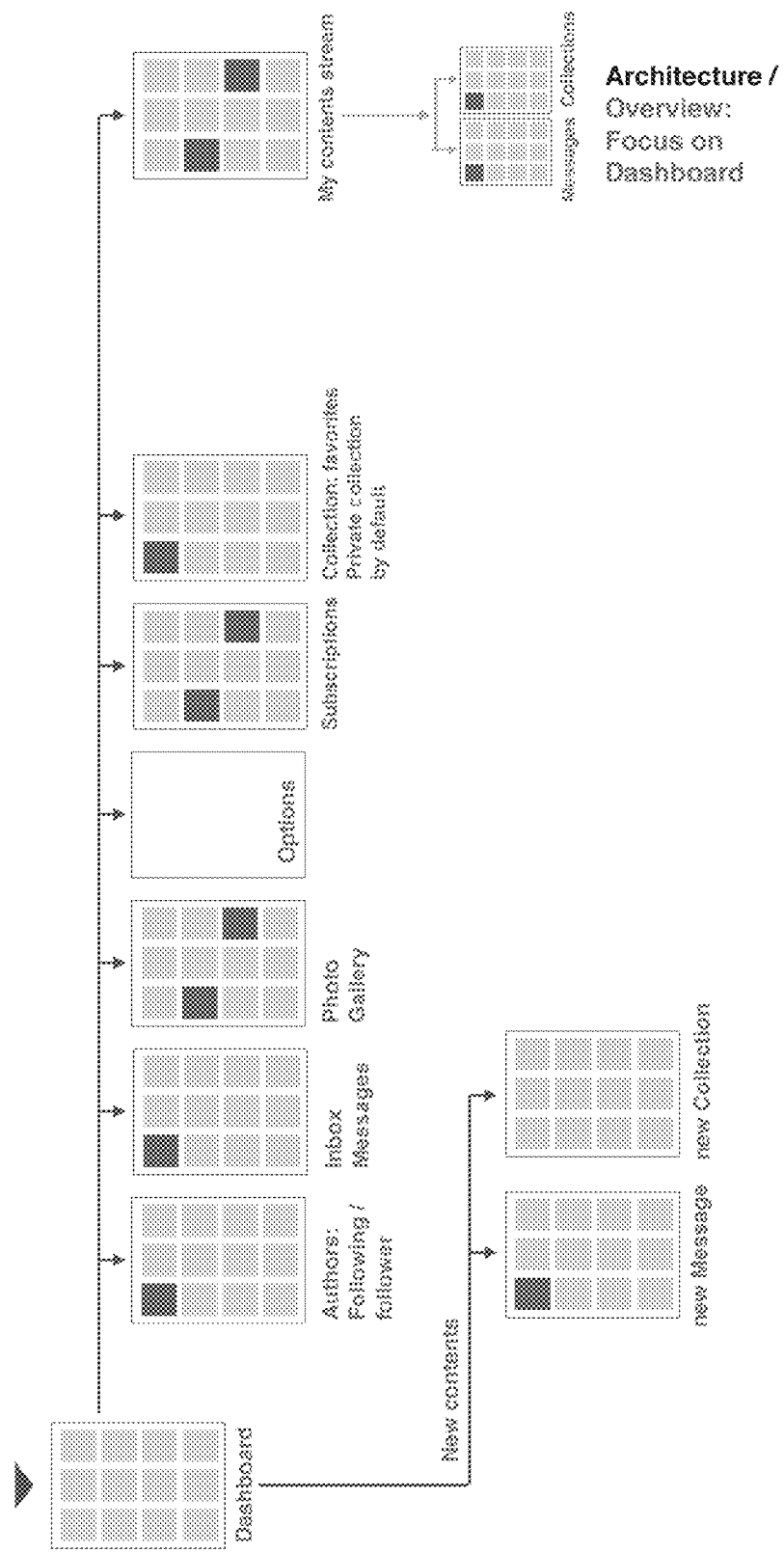
FIG. 26 depicts an exemplary collocation of the project in the ecosystem.
Figure 27:
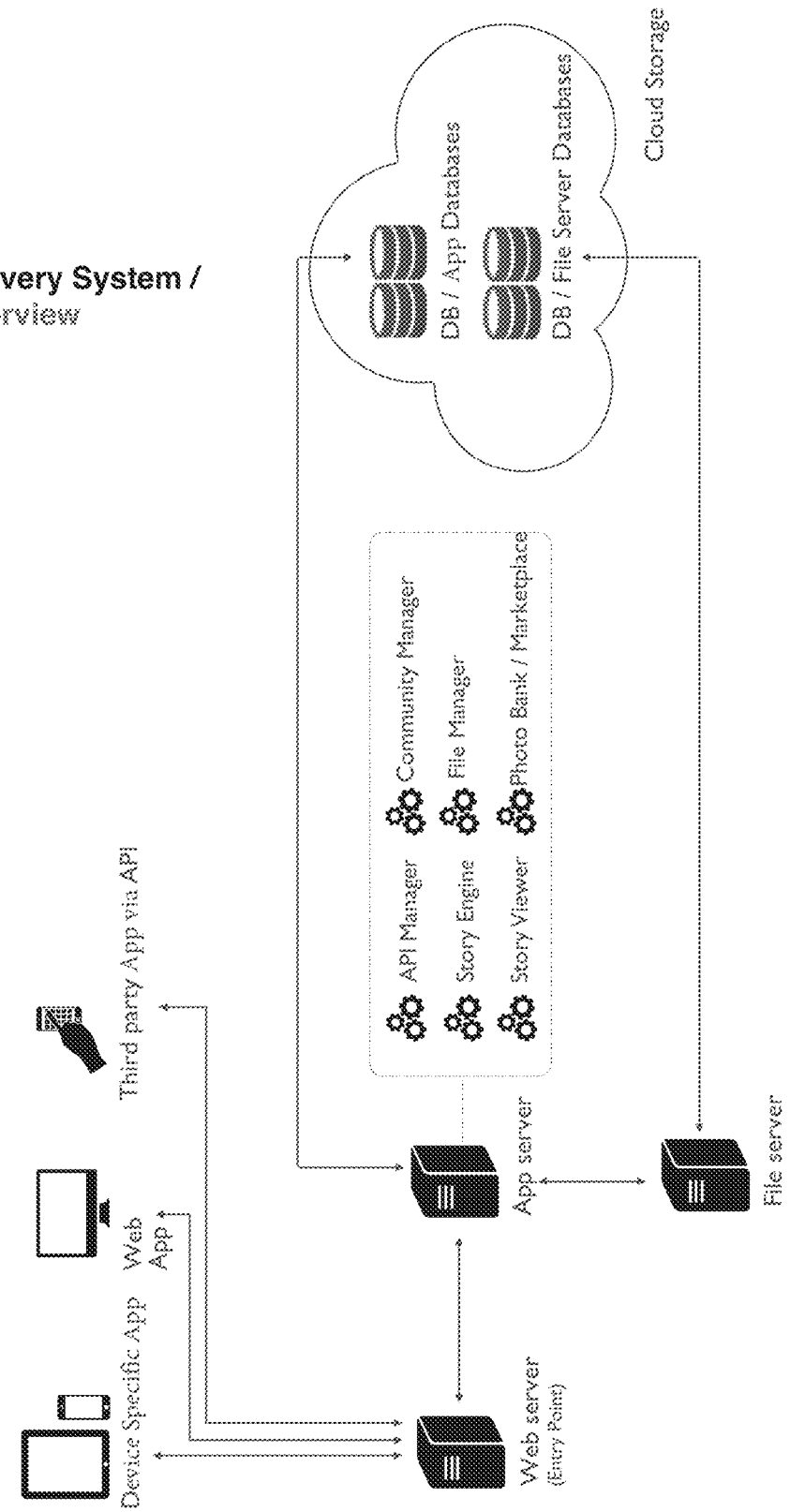
FIG. 27 illustrates an exemplary client/server architecture.

FIG. 26 depicts an exemplary collocation of the project in the ecosystem.

The FIGS. 24, 25, and 26 illustrate an exemplary overview of the whole application.

The system may comprise, or be characterized by, a client/server architecture (FIG. 24).

The web server (entry point) can administer every request from the different levels of the application and can direct appropriately the requests to the application server.

The server side of the application hosts the system manager of the application which provides all the interactions, database access, and a series of functionalities for the creation and visualization of content.

A separate server can manage the access and use of data. This differentiation between servers, offers a logic separation between data and content, and permits the management of a separate photo bank.

A system of APIs is created which allows third parties access to the public functions of the system and the integration of these functions within applications or web applications of third parties.

The system allows developers a series of functions that allows the use of the application.

The functional libraries comprise at least a first type and a second type. The first functional library type comprises the consultation functions, which allow the creating of third party services that display, list or allow access to public content in the system.

A second functional library type comprises the creation functions, which allow the creation of messages through an external graphical user interface of the application, while remaining within the application. Thus, although they are created by external systems, all the content produced follow the rules of the application and remain within the application.

Starting from these functions, the system makes available at least two types of preconfigurable modules which can be integrated on an external website (website, social network, landing page, and any other web service), as described below.

Figure 20:
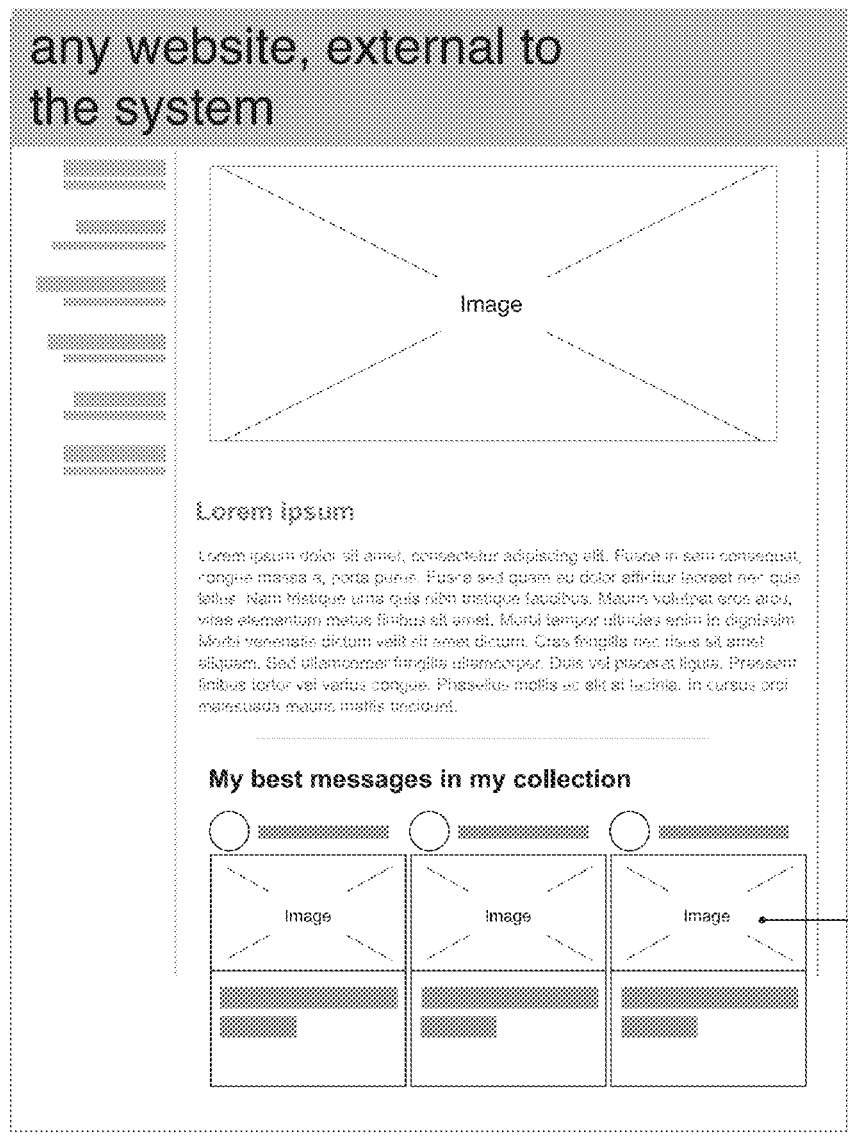
FIG. 20 illustrates an exemplary way to include previews of the messages in an external website.

The first type of preconfigurable module shows a preview of one or more messages made in a specific context (2005) of FIG. 20. It can be customized to show the number of elements that a user wants. The elements are selected in a specific space directly decided by the user among the available ones (personal profile, project, collection, etc.) and selected depending on a precise criteria: the last published ones, the most viewed, the most commented, the most liked ones (for example: a landing page or a blog (FIG. 20) that shows the preview of the messages on a project, collection or specific profile).

Figure 21:
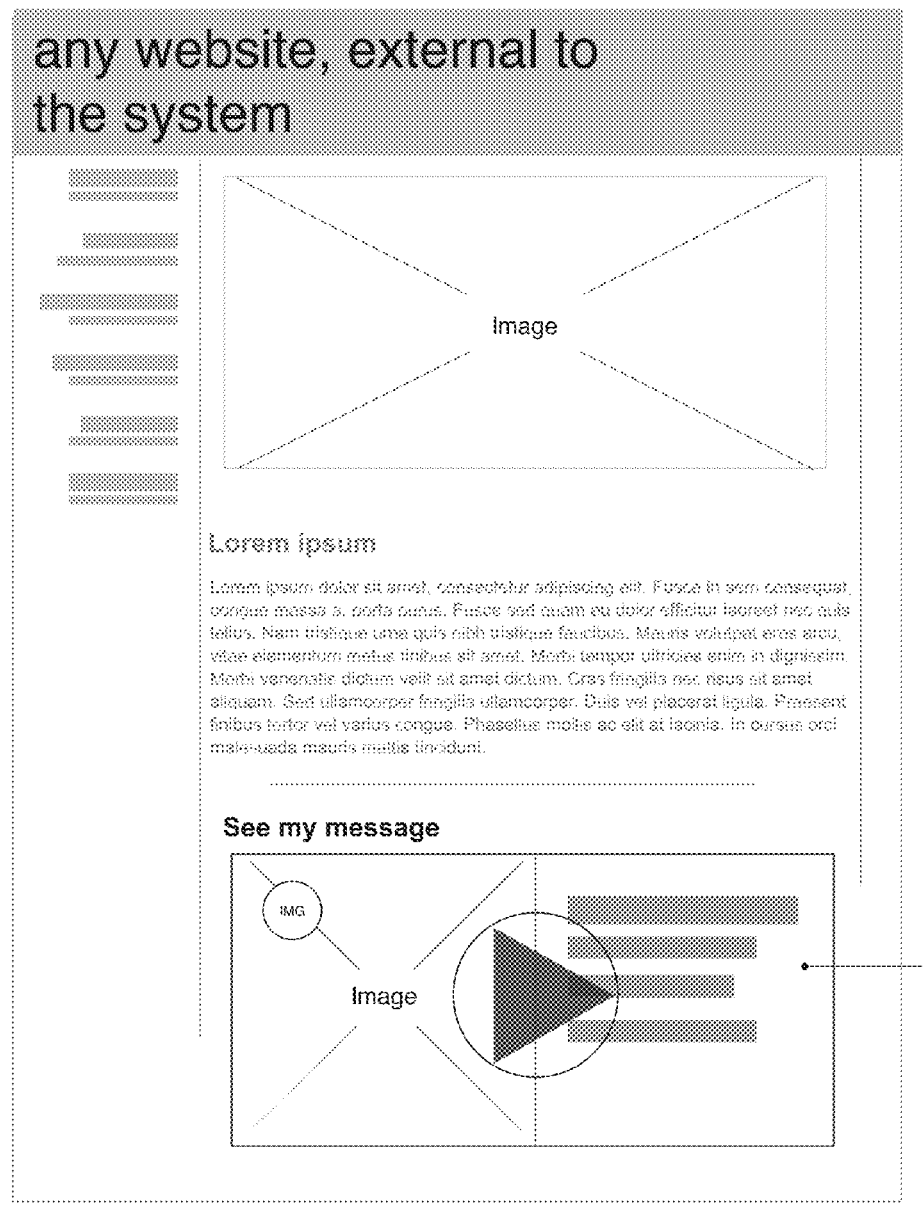
FIG. 21 illustrates an exemplary way to embed an interactive player in an external website.
Figure 22:
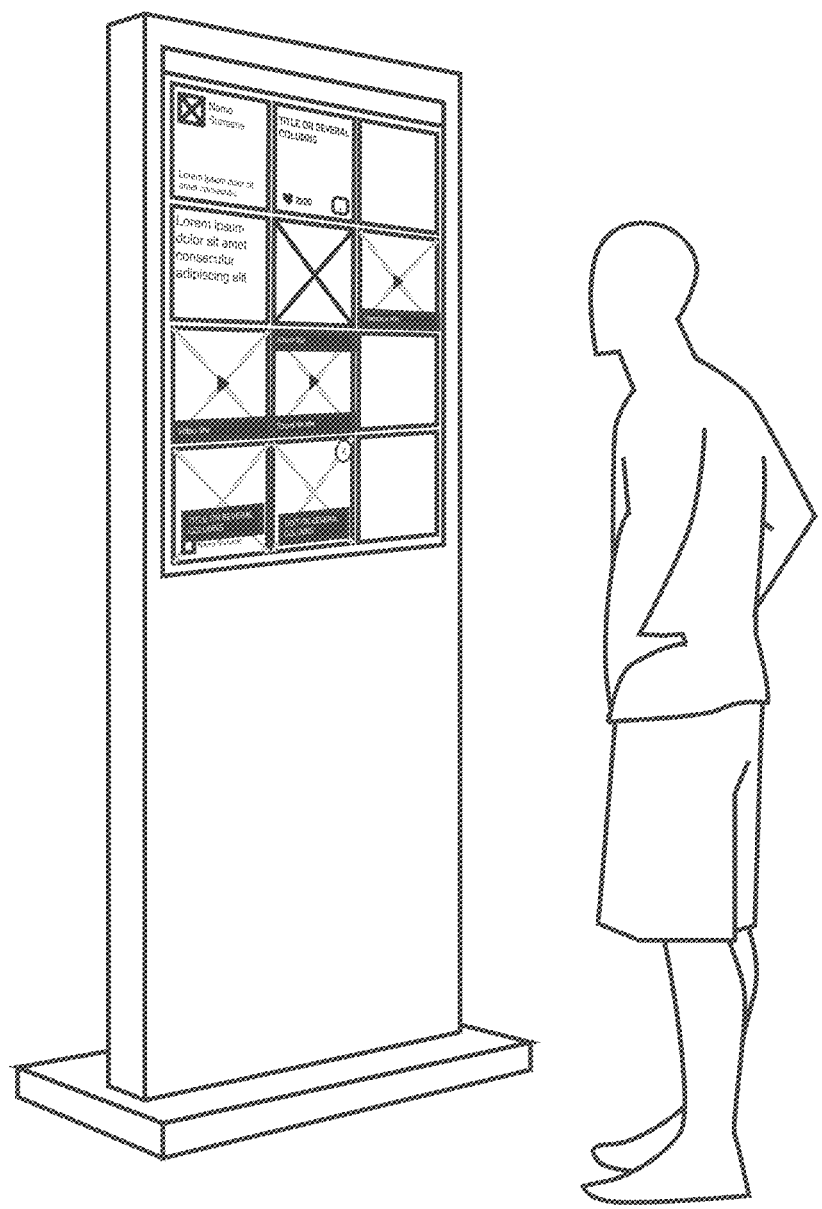
FIG. 22 illustrates an exemplary way to display the message on a generic interactive screen.

The second type of preconfigurable module comprises a player which can be embedded in a website (2105) of FIG. 21 or social network or any other interactive service (eg. totem or vertical screen in shopping centers as in FIG. 22). This player shows the selected message and gives the same type of interactions that are in the native system (appreciation, sharing, comment, etc.). Moreover, this player allows a series of additional discovery functions tied to the native contest (profile, project or collection) and to the category of the message.

The system offers a third group of functions that allow to create an automatic message. The system automatically combines a series of multimedial content given by a user in a message with a layout selected among the available ones. The system allows users to modify the initial contents or choose a new available template. All these functions are used both internally, to produce an automatic message, both as public APIs to develop third parties services.

The system can be used with a physical device created on purpose for the use of the application, which enlarges the ecosystem of the entire system.

Figure 23:
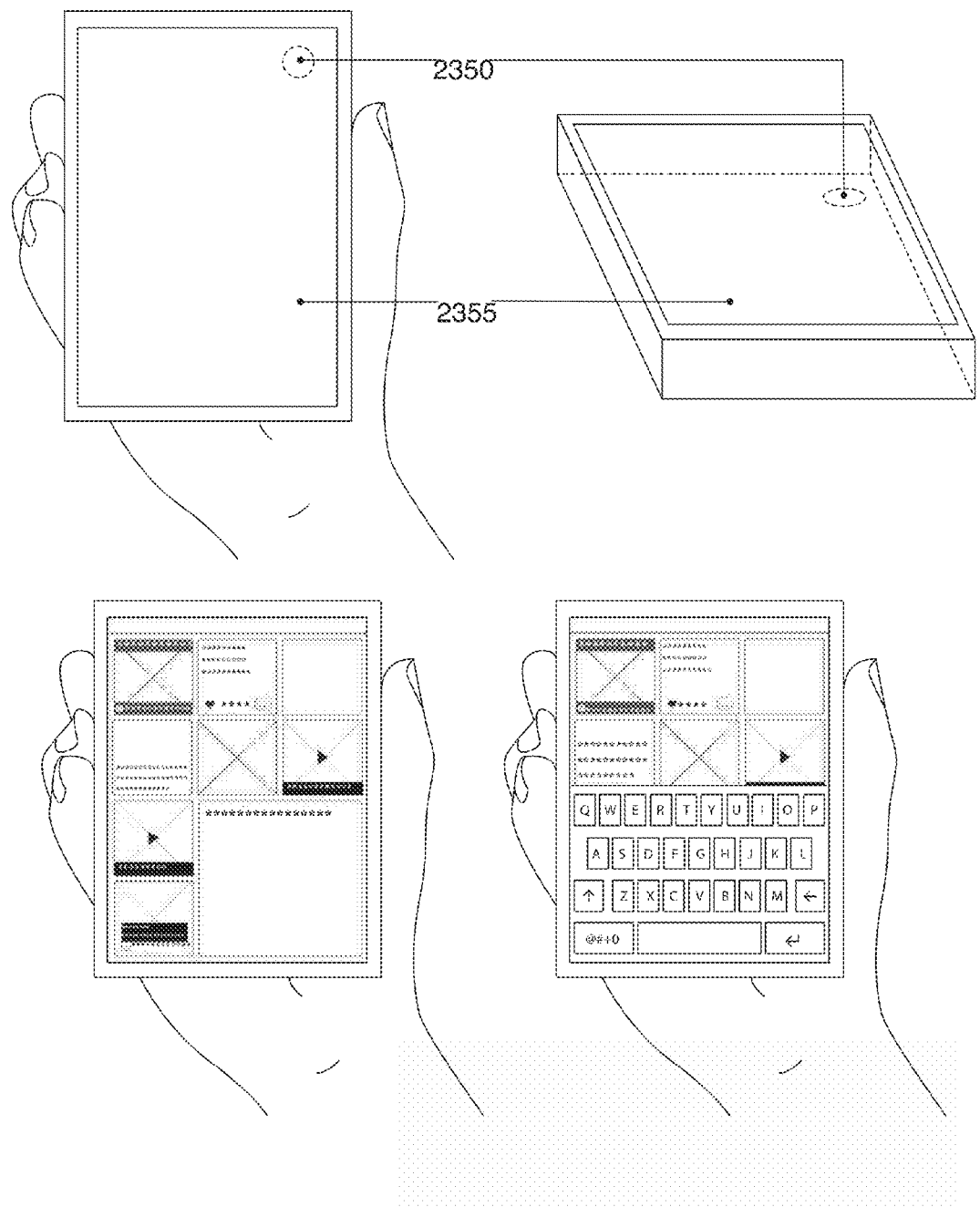
FIG. 23 illustrates an exemplary device.

This physical device can be called a cam (FIG. 23). The cam comprises a camera to take audio and video content (2350 in FIG. 23) and a multifunctional display (2355) through which a user can interact with the system and create messages in a mobile context.

The cam can be connected to a telephone network, a wireline network, and/or a wireless network, to allow real time transmission of messages.

Figure 8:
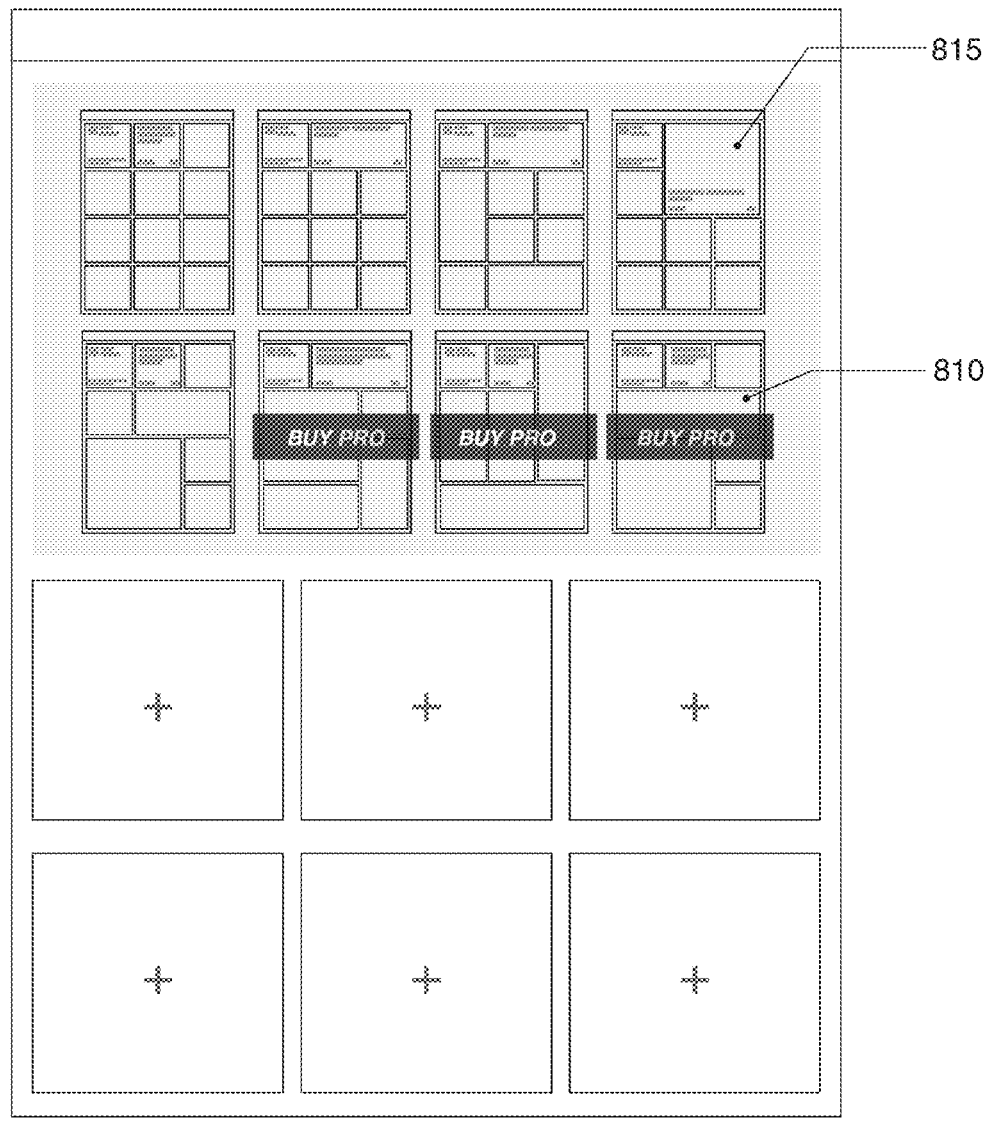
FIG. 8 illustrates options in choosing or buying a layout of cells.

As shown in FIG. 8, an example embodiment may be implemented in which certain layouts of cells for a message may be available as a choice from the user (805), while others may be purchased separately by the user (810).

Every element in a message is independent from the other elements and can also be searchable. Text is not rendered as an image, therefore it can be searched. Images could be searchable for example through an image search engine.

A cell may also contain and embed in a module reference to other messages or to collections of messages or to a specific author (links internal to the application to profiles of a message author).

A message may also be referred to as a mixxie, as it mixes different kind of content in one document, while keeping the contents separate and independent.

A message, or mixxie, comprises a container of content, in which each module can embed different kinds of digital content and the user/author can define not only the kind of content but also the size (and/or the importance or the space) that this content has relatively to the mixxie/page as a whole.

An example embodiment may be implemented in which a system may be configured to implement the methods of the present disclosure. The system may comprise one or more of the following elements, comprising: a web server running a server application configured to connect to a specific device, running a device specific application, such as a smartphone or tablet, a web application for desktop or laptop computers, and a third party application. The system may also comprise an application server, configured to manage application programming interfaces, story engine (organizing stories of mixxies), story viewer (viewing stories created), community manager (for example moderating comments), file manager (organizing files), photo bank marketplace and application databases. The system may also comprise a file server, configured to manage file server databases, and the web server may be configured to connect to the application server, the application server may be configured to connect to the file server, and the application databases and file server databases can be hosted in a cloud server environment.

An example embodiment may be implemented in which mixxies may be built automatically by the system by assembling content provided by a user, or content available on a website or other sources.

In some embodiments, a user interface for the devices of the present application may comprise one or more of a mouse, a keyboard, a stylus, a haptic device sensitive to a finger gesture from the user, an acoustic device sensitive to a voice-activation from the user, a graphical user interface, or a GUI-actuated keypad simulator.

The methods and systems described in the present disclosure may be implemented in hardware, software, firmware or any combination thereof. Features described as blocks, modules, or components may be implemented together (e.g., in a logic device such as an integrated logic device) or separately (e.g., as separate connected logic devices). The software portion of the methods of the present disclosure may comprise a computer-readable medium which comprises instructions that, when executed, perform, at least in part, the described methods. The computer-readable medium may comprise, for example, a random access memory (RAM) and/or a read-only memory (ROM). The instructions may be executed by a processor (e.g., a digital signal processor (DSP), an application specific integrated circuit (ASIC), a field programmable logic array (FPGA), a graphic processing unit (GPU) or a general purpose CPU (central processing unit) or other microprocessor.

Example embodiments of the present invention are thus described in relation to a method, which comprises presenting, to a user of a first computer, a plurality of layout formats, wherein each of plurality the layout formats is user-selectable for dividing a viewing area of the first computer area into a corresponding plurality of cells, which is unique in relation to the other layout formats.

A single-page document is created, which based on a user-selection of one of the plurality of layout formats, divides the displayed viewing area into the unique plurality of cells corresponding thereto.

A corresponding item of media content is assigned to each cell of the selected unique plurality, designated from among a plurality of media content items according to a user selection.

The created single-page document is rendered over the divided viewing area based on the assignment.

The rendered document comprises one or more of: each of the media content items displayed within each of the corresponding cells, and upon activating an interface associated with a selected cell of the document, one or more of an expanded view or an enlarged view of the media content items, or a view thereof which is displaced spatially in relation to the selected cell.

A number of example embodiments have been described in relation to the present disclosure. Nevertheless, it will be understood that various modifications may be made without departing from the spirit and scope of the present disclosure. Accordingly, other embodiments are within the scope of the following claims.

The examples set forth above are provided to those of ordinary skill in the art as a complete disclosure and description of how to make and use the embodiments of the disclosure, and are not intended to limit the scope of what the inventor/inventors regard as their disclosure.

Modifications of the above-described modes for carrying out the methods and systems herein disclosed that are obvious to persons of skill in the art are intended to be within the scope of the following claims. All patents and publications mentioned in the specification are indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

What is claimed is:

1. A method, comprising:
presenting, to a user of a first computer, a plurality of different layout formats, wherein each of the layout formats is user-selectable for dividing a viewing area of the first computer area into a corresponding plurality of cells forming a rectangular grid structure;
creating a single-page document, which based on a user-selection of one of the plurality of layout formats, divides the displayed viewing area into the plurality of cells corresponding thereto, the cells of the plurality of cells being mergeable to create larger areas for media content;
assigning to at least one cell of the selected plurality, a corresponding item of media content designated from among a plurality of media content items according to a user selection;
rendering the created single-page document over the divided viewing area based on the assigning, wherein the rendering comprises:
  i) for each cell with a corresponding item of media content, displaying the corresponding item of media content within the cell; and
  ii) upon activating an interface associated with a selected cell of the document, displaying one or more of an expanded view of the media content items or a view thereof which is displaced spatially in relation to the selected cell,
wherein the assigning to the at least one cell of the selected plurality a corresponding item of media content comprises:
selecting the at least one cell according to input from the user;
inserting a video or image into the at least one cell according to input from the user;
configuring the at least one cell for resizing the video or image within the at least one cell according to input from the user;
inserting a text box onto the video or image within the at least one cell according to input from the user;
configuring the text box for accepting text, according to input from the user; and inserting text in a title cell according to input from the user; and presenting the created single-page document to the user.

2. The method as described in claim 1, wherein each of the plurality of media content items further comprises at least one of: an image, a written text, an audio file, and at least one item from the following group: a video, a website link, an electronic magazine, a document file, or a hyperlink.

3. The method as described in claim 1, wherein the first computer further comprises a user interface operable for accepting a user input in relation to one or more of the creating, the assigning, or the rendering.

4. The method as recited in claim 3 wherein the user interface further comprises one or more of a mouse, a keyboard, a stylus, a haptic device sensitive to a finger gesture from the user, an acoustic device sensitive to a voice-activation from the user, a graphical user interface (GUI), or a GUI-actuated keypad simulator.

5. The method as described in claim 1, further comprising one or more of:

receiving, on a first server, a message sent from at least a second computer; or sending, with the first computer, a message to at least the second computer; and wherein each message comprises the single-page document.

6. The method as described in claim 5, wherein one or more of the first computer or the second computer further comprises a tablet, a smartphone, or a personal computer or other laptop or desktop computer.

7. The method as described in claim 5, further comprising configuring the single-page document to be used for microblogging, journalism or advertising.

8. The method as described in claim 1, wherein the layout format further comprises one of:

twelve cells, each of which has a first spatial area, and which are arranged into an array comprising four rows by three columns distributed over the viewing area; or fifteen cells, each having a second spatial area smaller than the first spatial area, and which are arranged into an array comprising five rows by three columns distributed over the viewing area.

9. The method as described in claim 1 wherein the plurality of cells further comprises at least one cell with a first spatial area and at least one cell with a second spatial area, which differs from the first spatial area.

10. The method as described in claim 1, further comprising changing the selected layout format based on a subsequent user input wherein the displayed viewing area is re-divided into a correspondingly subsequent plurality of cells.

11. The method as described in claim 1, further comprising displaying the title of the single-page document as content displayed in one of the cells.

12. The method as described in claim 1, further comprising displaying information relating to an author of the single-page document as content in one of the cells.

13. The method as described in claim 1 wherein the user comprises a first user of at least two users, the method further comprising editing the single-page document through the first user and at least a second user of the at least two users.

14. The method as described in claim 1 wherein the single-page document further comprises a first document of a plurality of available single-page documents and wherein the user comprises a first user of at least two users, the method further comprising:

selecting at least a second document of the plurality of available single-page documents; and creating a collection of single-page documents, the collection comprising the first document and the selected at least second document.

15. The method as described in claim 14 wherein the creating the collection of single-page documents further comprises one or more of:

classifying the collection in relation to at least a third document; or collaborating between the first user and a second of the at least two users.

16. The method as described in claim 1, further comprising displaying at least one comment on the single-page document.

17. The method as described in claim 1, further comprising automatically adapting each of the plurality of content items to a size of the corresponding cells designated in relation thereto.

18. The method as described in claim 1, further comprising displaying a link on the single-page document relating to an information profile of the user.

19. The method of claim 1, wherein the configuring the first cell for resizing the video or image further comprises resizing and centering the video or image according to input from the user.

20. The method as described in claim 19, wherein the media content items further comprise at least one item from the following group: an image, a written text, a video, an audio file, a website, an electronic magazine, a document file, or a hyperlink.

21. The method of claim 1, wherein the resizing the video or image further comprises expanding the video or image to two or more cells.

22. The method of claim 1, wherein the assigning to each cell of the selected plurality a corresponding item of media content further comprises adding a link to a webpage within a second cell, according to input from the user.

23. The method of claim 1, further comprising encoding the single-page document to be transmitted to a server for display to other users.

24. The method of claim 1, wherein the encoding comprises use of an application programming interface.

25. The method of claim 1, wherein inserting a video or image into the at least one cell according to input from the user further comprises inserting a video.

26. The method of claim 1, further comprising integration of the created single-page document onto an external web application.

27. The method of claim 26, wherein the integration further comprises presenting previews of one or more of other created single-page documents.

28. The method of claim 26, wherein the integration further comprises an embedded player showing the created single-page document.

* * * * *